United States Patent
Yokota et al.

(10) Patent No.: US 8,792,460 B2
(45) Date of Patent: Jul. 29, 2014

(54) RADIO TERMINAL AND TRANSMISSION RATE PREDICTION METHOD

(75) Inventors: Tomoyoshi Yokota, Yokohama (JP); Fangwei Tong, Yokohama (JP); Atsushi Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 246 days.

(21) Appl. No.: 13/387,708

(22) PCT Filed: Jul. 28, 2010

(86) PCT No.: PCT/JP2010/062735
§ 371 (c)(1),
(2), (4) Date: Apr. 13, 2012

(87) PCT Pub. No.: WO2011/013724
PCT Pub. Date: Feb. 3, 2011

(65) Prior Publication Data
US 2012/0188989 A1    Jul. 26, 2012

(30) Foreign Application Priority Data

Jul. 29, 2009 (JP) .................................. 2009-177109

(51) Int. Cl.
*H04J 3/00* (2006.01)
(52) U.S. Cl.
USPC .......................... 370/336; 370/431; 370/341
(58) Field of Classification Search
USPC .......................................... 370/447; 375/224
See application file for complete search history.

(56) References Cited

U.S. PATENT DOCUMENTS

2004/0160984 A1    8/2004    Sidhushayana et al.

FOREIGN PATENT DOCUMENTS

| JP | 2006-100935 A | 4/2006 |
|---|---|---|
| JP | 2006-518170 A | 8/2006 |
| JP | 2006-270728 A | 10/2006 |
| JP | 2007-281553 A | 10/2007 |

OTHER PUBLICATIONS

Yavuz et al. "Adaptive Rate Control in High Data Rate Wireless Networks" Wireless Communications and Networking, 2003. WCNC 2003. 2003 IEEE, Mar. 20, 2003, vol. 2 pp. 866-871.*
M.Yavuz et al.; "Adaptive Rate Control in High Data Rate Wireless Networks"; IEEE Wireless Communications and Networking; vol. 2; pp. 866-871; 2003.
International Search Report; PCT/JP2010/062735; Sep. 14, 2010.
An Office Action; "Notice of Reason for Rejection," issued by the Japanese Patent Office on Jul. 30, 2013, which corresponds to Japanese Patent Application No. 2009-177109 and is related to U.S. Appl. No. 13/387,708; with Statement of Relevance.

* cited by examiner

*Primary Examiner* — Andrew Lai
*Assistant Examiner* — Jamaal Henson
(74) *Attorney, Agent, or Firm* — Studebaker & Brackett PC

(57) ABSTRACT

In a radio communication system employing HARQ scheme wherein the maximum number of slots is changed, a radio terminal (1) which calculates a predictive transmission rate being the predictive value of a downlink transmission rate at a future time after the receiving time of a downlink radio signal is provided with a storage unit (15A) which stores in association with a DRC a corrected transmission rate obtained by causing a defined transmission rate being a downlink transmission rate in the case of using all the maximum number of slots to reflect the probability of succeeding in decoding data using only some of the slots, and a calculation unit (142) which predicts the reception quality at the future time on the basis of the reception quality before the receiving time, obtains from the storage unit (15A) the corrected transmission rate associated with the DRC corresponding to the predicted reception quality, and calculates the predictive transmission rate from the obtained corrected transmission rate.

8 Claims, 19 Drawing Sheets

FIG. 4

| DRC | DEFINED TRANSMISSION RATE [kbps] | MAXIMUM SLOT NUMBER | DRC | DEFINED TRANSMISSION RATE [kbps] | MAXIMUM SLOT NUMBER |
|---|---|---|---|---|---|
| 1 | 38.4 | 16 | 8 | 921.6 | 2 |
| 2 | 76.8 | 8 | 9 | 1228.8 | 1 |
| 3 | 153.6 | 4 | 10 | 1228.8 | 2 |
| 4 | 307.2 | 2 | 11 | 1843.2 | 1 |
| 5 | 307.2 | 4 | 12 | 2457.6 | 1 |
| 6 | 614.4 | 1 | 13 | 1536 | 2 |
| 7 | 614.4 | 2 | 14 | 3072 | 1 |

| DRC | DEFINED TRANSMISSION RATE (kbps) |
|---|---|
| 1 | 38.4 |
| 2 | 76.8 |
| 3 | 153.6 |
| 4 | 307.2 |
| 5 | 307.2 |
| 6 | 614.4 |
| 7 | 614.4 |
| 8 | 921.6 |
| 9 | 1228.8 |
| 10 | 1228.8 |
| 11 | 1843.2 |
| 12 | 2457.6 |
| 13 | 1536 |
| 14 | 3072 |

CONSIDER EARLY · TERMINATION (b)

| DRC | CORRECTED TRANSMISSION RATE (kbps) |
|---|---|
| 1 | 40 |
| 2 | 80 |
| 3 | 180 |
| 4 | 350 |
| 5 | 400 |
| 6 | 614.4 |
| 7 | 750 |
| 8 | 1000 |
| 9 | 1228.8 |
| 10 | 1500 |
| 11 | 1843.2 |
| 12 | 2457.6 |
| 13 | 1800 |
| 14 | 3072 |

FIG. 16

| SINR=-8~-6dB | |
|---|---|
| DRC | CORRECTED TRANSMISSION RATE (kbps) |

| SINR=-10~-8dB | |
|---|---|
| DRC | CORRECTED TRANSMISSION RATE (kbps) |

| SINR=-12~-10dB | |
|---|---|
| DRC | CORRECTED TRANSMISSION RATE (kbps) |
| 1 | 37.17 |
| 2 | 59.3 |
| 3 | 122.9 |
| 4 | 215 |
| 5 | 250.3 |
| 6 | 276.5 |
| 7 | 201.5 |
| 8 | 193.5 |
| 9 | 159.7 |
| 10 | 99.5 |
| . | . |
| . | . |
| . | . |
| . | . |

...

ASSIGNMENT RATIO CALCULATION EXAMPLE=T1×F1/T×F

RADIO TERMINAL AND TRANSMISSION RATE PREDICTION METHOD

TECHNICAL FIELD

The present invention relates to a radio terminal that calculates a predictive value of a downlink transmission rate at a future time, and a transmission rate prediction method.

BACKGROUND ART

Conventionally, as a technology for improving the transmission efficiency in radio communication, hybrid automatic repeat request (HARQ) has been disclosed. In the HARQ, a radio base station may perform error correction coding (turbo coding and the like) on data to be transmitted to a radio terminal, and transmit a radio signal including error correction coded data to the radio terminal by using a plurality of time slots.

A maximum number of time slots (hereinafter, referred to as a "maximum slot number") used for the transmission of the radio signal in the HARQ is switched according to the reception quality of the radio signal in the radio terminal. A downlink transmission rate achieved when a maximum number of slots are used up (are all used) has been defined in the specifications of a radio communication system, and will be referred to as a "defined transmission rate" in the following description.

In general, since a downlink transmission rate is changed according to reception quality in a radio terminal, it is considered to control a transmission rate of data, which is transmitted by a communication destination apparatus (for example, a server or a communication terminal) of the radio terminal, according to the downlink transmission rate.

Here, when a downlink transmission rate measured by the radio terminal is transmitted to the communication destination apparatus, the time difference may occur between a measurement time of the downlink transmission rate and a data transmission time in the communication destination apparatus. Therefore, it is preferable that the radio terminal calculates a predictive value of the downlink transmission rate (hereinafter, referred to as a "predictive transmission rate") at a future time (that is, the data transmission time in the communication destination apparatus), and transmits the predictive transmission rate to the communication destination apparatus.

As a transmission rate prediction method for calculating a predictive transmission rate, the following method has been disclosed (for example, see Patent Document 1). Specifically, a radio terminal predicts reception quality at a future time based on the reception quality of a current (and previous) radio signal, and a defined transmission rate corresponding to the predicted reception quality (hereinafter, referred to as a "predictive reception quality") is calculated as the predictive transmission rate.

PRIOR ART DOCUMENT

Patent Document

Patent Document 1: JP-A-2006-100935 (paragraphs [0018] to [0028] and the like)

SUMMARY OF THE INVENTION

However, the conventional transmission rate prediction method that calculates the defined transmission rate corresponding to the predictive reception quality as the predictive transmission rate has the following problem.

Specifically, a radio terminal may succeed in data decoding (hereinafter, referred to as an "early termination") using only some of the slots without using all the slots. In such a case, only some of the slots is used, and as a result, a downlink transmission rate is increased as compared to the case with a downlink transmission rate (that is, a defined transmission rate) when all the slots are used.

However, according to the conventional transmission rate prediction method, since the predictive transmission rate is calculated without considering the influence exerted by the early termination on the downlink transmission rate, an error may occur in the calculated predictive transmission rate.

Therefore, the present invention has been achieved in view of the above-described problem, and an object thereof is to provide a radio terminal and a transmission rate prediction method, capable of accurately calculating a predictive transmission rate even when the maximum slot number is dynamically changed according to reception quality in a radio terminal.

To solve the above problem, the present invention has following features. A first feature of the present invention is summarized as a radio terminal (radio terminal 1) that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station (radio base station 20), the radio terminal comprising: a decoding unit (decoding unit 13a) configured to decode data included in the received downlink radio signal; a storage unit (storage unit 15A or storage unit 15B) configured to associate a corrected transmission rate with any one index value (DRC or CQI) of the downlink transmission rate or the reception quality and store the resultant corrected transmission rate, wherein the corrected transmission rate is calculated from a probability that the decoding unit succeeds in decoding data in some of the slots and a defined transmission rate as a downlink transmission rate when all the slots are used; and a calculation unit (calculation unit 142) configured to predict reception quality at the future time based on reception quality before the reception time, acquire the corrected transmission rate which is associated with the index value of the predicted reception quality from the storage unit, and calculate the predictive transmission rate from the acquired corrected transmission rate.

According to the feature, the predictive transmission rate is calculated by using the corrected transmission rate obtained by reflecting the probability that the decoding unit succeeds in data decoding (i.e., early termination) using only some of the slots, and therefore, it is possible to calculate the predictive transmission rate in which the influence exerted by the early termination on the downlink transmission rate is considered, resulting in calculation of a predictive transmission rate with a good accuracy.

A second feature of the present invention according to the first feature is summarized as that the calculation unit calculates a decoding success rate ($P_{DRC_n}$), which indicates probability that the decoding unit succeeds in data decoding at an nth downlink time slot of all the slots, for each index value, and calculates the corrected transmission rate from the calculated decoding success rate and the defined transmission rate for each index value, and the storage unit associates the corrected transmission rate calculated by the calculation unit with the index value, and stores the resultant corrected transmission rate.

A third feature of the present invention according to the second feature is summarized as that the calculation unit calculates the corrected transmission rate $S_{DRC}$ according to the Equation below, when the index value is a DRC, the maximum slot number is $N_{DRC}$, the defined transmission rate is $T_{DRC}$, and the decoding success rate at the nth downlink time slot is $P_{DRCn}$.

$$S_{DRC} = \sum_{n=1}^{N_{DRC}} \left( T_{DRC} \times \frac{N_{DRC}}{n} \times P_{DRCn} \right)$$

A fourth feature of the present invention according to the second feature is summarized as that the calculation unit counts a succeeded number of decoding which is a number of times by which the decoding unit succeeds in data decoding at the nth downlink time slot, for each index value, and calculates a ratio of the succeeded number of decoding with respect to a total number of receptions of the nth downlink time slot as the decoding success rate.

A fifth feature of the present invention according to the fourth feature is summarized as that the calculation unit repeatedly calculates the corrected transmission rate for each index value in real-time.

A sixth feature of the present invention according to the fourth feature is summarized as that the storage unit stores the defined transmission rate in addition to the corrected transmission rate, the calculation unit calculates a weighted average of the corrected transmission rate and the defined transmission rate, and the storage unit stores the corrected transmission rate ($S_{DRC\_HARQ}$) after the weighted averaging.

A seventh feature of the present invention according to the first feature is summarized as that the storage unit stores correspondence between the index value and the corrected transmission rate for each reception quality, and the calculation unit acquires the corrected transmission rate from the correspondence stored in the storage unit, which corresponds to the index value according to the predicted reception quality according to the reception quality of the received radio signal, and calculates the predictive transmission rate from the acquired corrected transmission rate.

An eighth feature of the present invention according to the first feature is summarized as that the calculation unit calculates assignment ratios indicating an occupying ratio of a downlink time slot assigned to the radio terminal in a predetermined period in all downlink time slots assignable by the radio base station in the predetermined period before the reception time, and calculates the predictive transmission rate from the acquired corrected transmission rate and the calculated assignment ratios.

A ninth feature of the present invention according to the eighth feature is summarized as that the calculation unit calculates a multiplied result, as the predicted transmission rate, by multiplying an average value or a maximum value of the assignment ratios calculated for each predetermined period included in a setting period longer than the predetermined period.

A tenth feature of the present invention is summarized as a transmission rate prediction method that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station, the transmission rate prediction method comprising: a step of associating a corrected transmission rate with any one index value of the downlink transmission rate or the reception quality and storing the resultant corrected transmission rate in a storage unit, wherein the corrected transmission rate is calculated from a probability that data decoding succeeded using only a some of the slots and a defined transmission rate as a downlink transmission rate when all the slots are used; a step of predicting reception quality at the future time based on reception quality before the reception time; a step of acquiring the corrected transmission rate which is associated with the index value of the predicted reception quality from the storage unit; and a step of calculating the predictive transmission rate from the acquired corrected transmission rate.

According to the present invention, it is possible to provide a radio terminal and a transmission rate prediction method, capable of accurately calculating a predictive transmission rate even when the maximum slot number is dynamically changed according to reception quality in a radio terminal.

BRIEF DESCRIPTION OF THE DRAWINGS

FIG. 4 is a diagram illustrating a transmission rate table in which a transmission rate defined in the specifications of an EV-DO Rev. A, a DRC, and the maximum slot number are associated with one another.

FIG. 6 is a diagram explaining a corrected transmission rate according to the embodiment of the present invention.

FIG. 16 is a diagram illustrating a transmission rate table according to a fourth embodiment of the present invention.

MODES FOR CARRYING OUT THE INVENTION

Figure 1:
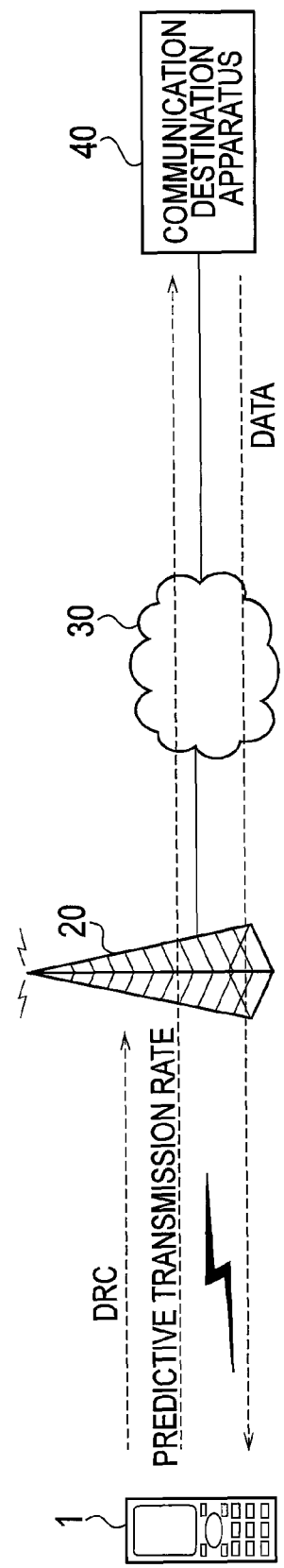
FIG. 1 is an entire schematic configuration diagram of a radio communication system according to an embodiment of the present invention.

Hereinafter, a first embodiment, a second embodiment, a third embodiment, a fourth embodiment, and other embodiments of the present invention will be described with reference to the accompanying drawings. In all drawings for explaining the following embodiments, the same or similar reference numerals are used to designate the same or similar elements.

(1) Overview of Radio Communication System

FIG. 1 is an entire schematic configuration diagram of a communication system including a radio terminal 1 according to first to fourth embodiments.

As illustrated in FIG. 1, the radio terminal 1 performs radio communication with a radio base station 20, and performs communication with a communication destination apparatus 40 through the radio base station 20 and a communication network 30. The communication destination apparatus 40, for example, includes a server or a communication terminal. In addition, FIG. 1 illustrates one radio terminal 1 that performs the radio communication with the radio base station 20. However, it is assumed that a plurality of radio terminals 1, 2 and the like perform radio communication with the radio base station 20.

In the first to fourth embodiments, it is assumed that the radio communication between the radio terminals 1, 2 and the like and the radio base station 20 is performed according to a cdma2000 nx evolution-data only (EV-DO) which is a kind of a third generation mobile phone system, and communication in the downstream direction (hereinafter, referred to as a "forward link in the EV-DO") will be mainly described.

The radio terminal 1 measures the reception quality (specifically, a signal to interference and noise ratio (SINR) or carrier to interference ratio (CIR) of a pilot signal) of a radio signal received from the radio base station 20. The radio terminal 1 predicts reception quality at a future time (that is, a next frame) from variation trend of the measured reception quality. The radio terminal 1 transmits data rate control (DRC) to the radio base station 20, wherein the data rate control indicates the "highest transmission rate receivable at a predetermined error rate or less" which is expected from predictive reception quality. The radio base station 20 receives DRCs from the radio terminals 1, 2 and the like.

The radio base station 20 assigns communication channels to the radio terminals 1, 2 and the like, respectively, and performs radio communication with the radio terminals 1, 2 and the like through the assigned communication channels. In the EV-DO, a frequency resource is divided in units of time (for example, 1/600 second) called a slot, and the slot is assigned to the radio terminals 1, 2 and the like as a communication channel. The radio base station 20 transmits a radio signal to the radio terminal 1 using the downlink time slot assigned to the radio terminal 1. In the following embodiments, the downlink time slot will be simply referred to as a "slot".

The radio base station 20 performs a scheduling process to efficiently assign slots to the radio terminals 1, 2 and the like based on the DRCs received from the radio terminals 1, 2 and the like. As the scheduling process, a so-called proportional fairness scheme is used. Specifically, the radio base station 20 calculates a DRC/R from the amount R of data, which is transmitted for a period (for example, 1.67 seconds) of previous predetermined slots (for example, 1000 slots), and the DRCs, which are received from the radio terminals 1, 2 and the like, for each of the radio terminals 1, 2 and the like, and assigns a slot to a radio terminal with the largest DRC/R value.

Figure 2:
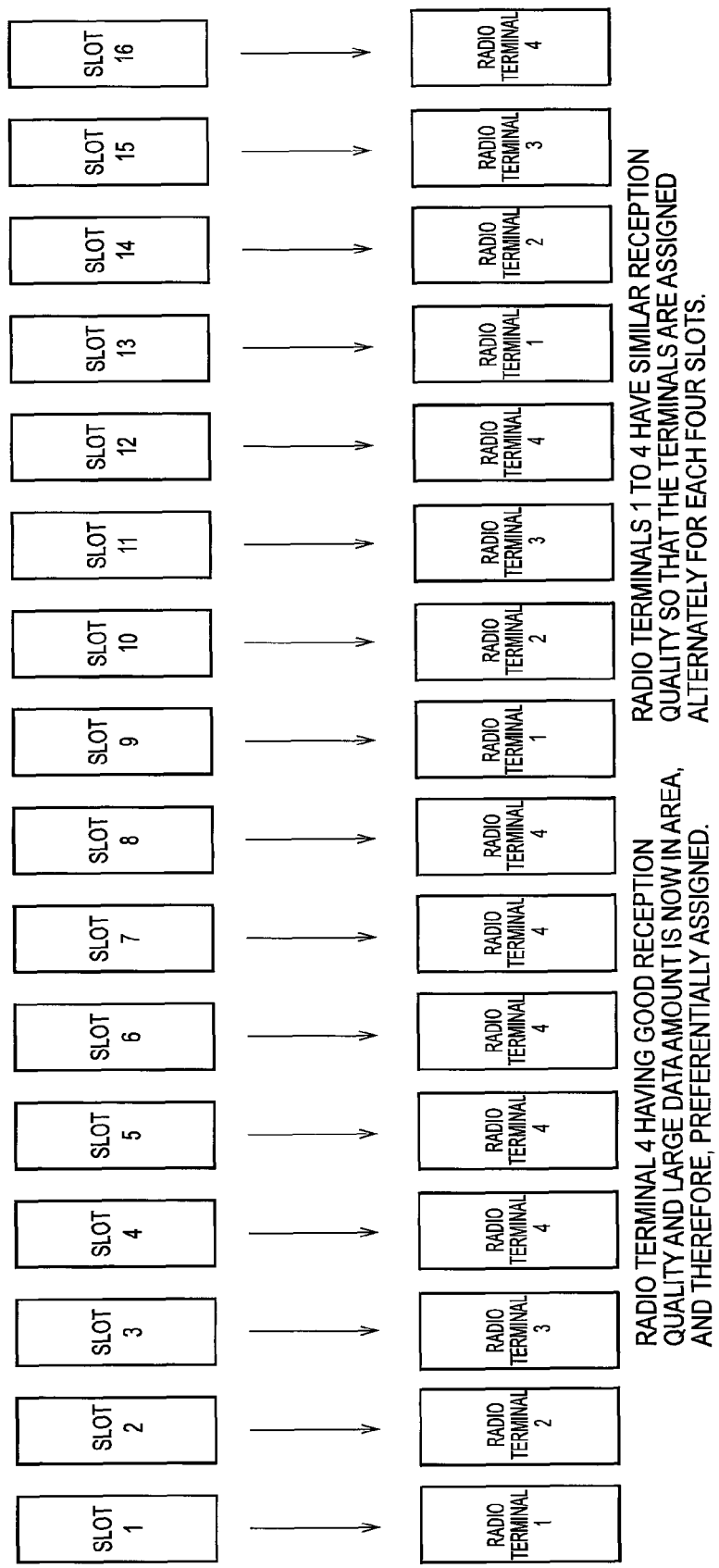
FIG. 2 is a diagram illustrating an example of a proportional fairness type scheduling process applied to the radio communication system according to the embodiment of the present invention.

FIG. 2 is a diagram illustrating an example of a proportional fairness type scheduling process. In the example of FIG. 2, a radio terminal 4, which has good reception quality and a large amount of data to be received from the radio base station 20, enters a communication area of the radio base station 20, so that slot 4 to slot 8 are continuously assigned to the radio terminal 4. After the slot 8, slots are alternately assigned to radio terminals 1 to 4 every four slots.

The radio base station 20 performs an adaptive modulation process according to the DRCs received from the radio terminals 1, 2 and the like, thereby changing a modulation scheme of a downlink radio signal. In the adaptive modulation, a plurality of modulation schemes (also called modulation classes) have been defined according to a combination of a modulation multi-level number and a coding rate. When the reception quality of a radio signal received in the radio terminal 1 from the radio base station 20 is high, the radio base station 20 selects a high speed modulation scheme with low error resistance. When the reception quality is low, the radio base station 20 selects a low speed modulation scheme with high error resistance.

HARQ is applied to the radio communication between the radio base station 20 and the radio terminals 1, 2 and the like. In the HARQ, a reception-side holds data failed in decoding without discarding the data, synthesizes the held data with retransmitted data, and decodes the synthesized data.

Figure 3:
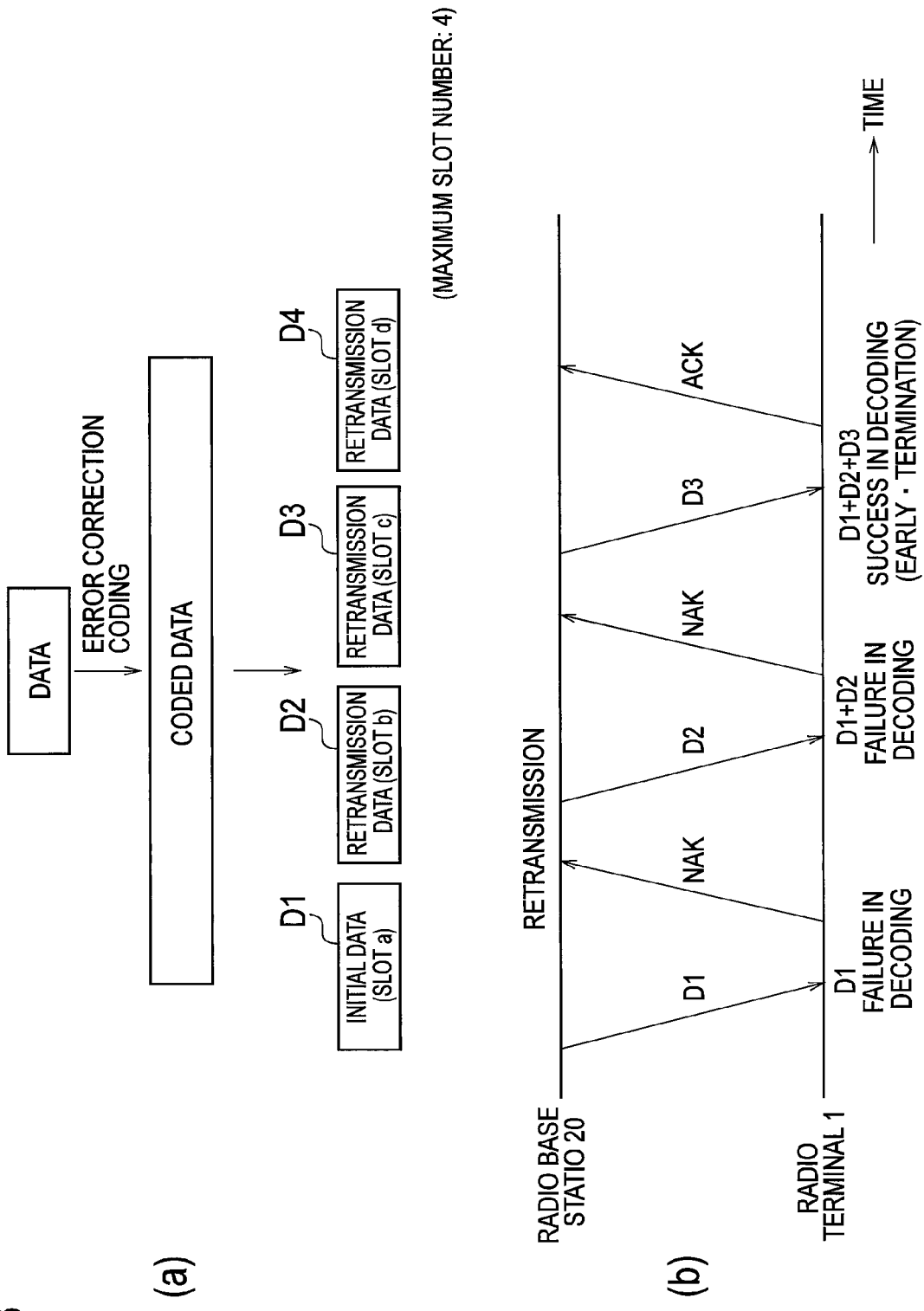
FIG. 3 is a diagram explaining HARQ applied to the radio communication system according to the embodiment of the present invention.

FIG. 3 is a diagram explaining the HARQ. As illustrated in FIG. 3($a$), the radio base station 20 may perform error correction coding (for example, turbo coding) on data to be transmitted to the radio terminal 1, and transmit a radio signal including error correction coded data to the radio terminal by using a plurality of slots (so-called multi-slot transmission). Slots having the maximum number of slots (a maximum slots number) used for the transmission of the radio signal is changed according to a DRC. In the example of FIG. 3($a$), the maximum slot number is 4.

As illustrated in FIG. 3($b$), the radio terminal 1 receives initial data D1 from the radio base station 20, and transmits a negative acknowledgment (NAK) to the radio base station 20 when the radio terminal 1 fails in decoding the initial data D1. At this time, the radio terminal 1 holds the initial data D1 failed in decoding.

If the NAK is received from the radio terminal 1, the radio base station 20 transmits retransmission data D2 to the radio terminal 1. When the retransmission data D2 is received from the radio base station 20, the radio terminal 1 synthesizes the held initial data D1 with the received retransmission data D2, and decodes synthesized data. Here, it is assumed that the radio terminal 1 fails in decoding the synthesized retransmission data D2. The radio terminal 1 transmits a NAK to the radio base station 20. At this time, the radio terminal 1 holds the initial data D1 and the retransmission data D2, which have been failed in decoding.

If the NAK is received from the radio terminal 1, the radio base station 20 transmits next retransmission data D3 to the radio terminal 1. When the retransmission data D3 is received from the radio base station 20, the radio terminal 1 synthesizes the held initial data D1 and retransmission data D2 with the received retransmission data D3, and decodes synthesized data. Here, it is assumed that the radio terminal 1 succeeds in decoding the synthesized retransmission data D3. The radio terminal 1 transmits a positive acknowledgment (ACK) to the radio base station 20. In this case, for the maximum slot number 4, decoding at the third slot is succeeded (that is, early termination).

FIG. 4 is a diagram illustrating correspondence relation between a DRC and a defined transmission rate defined in the specifications of an EV-DO Rev. A & a maximum slot number. In the example of FIG. 4, the DRC is in the range of 1 to 14, and DRCs are associated with defined transmission rates different from one another. In the DRC "14" corresponding to the state in which reception quality is highest, only one slot is used. Meanwhile, in the DRC "1" corresponding to the state in which the reception quality is lowest, 16 slots are used, so that the radio terminal 1 can decode data more apparently even at a low speed.

The radio terminal 1 transmits a DRC to the radio base station 20, thereby specifying a transmission rate of data to be transmitted by the radio base station 20. However, when the early termination occurs in the HARQ, an actual transmission rate is higher than a defined transmission rate specified by the DRC. Furthermore, when most slots are not assigned to the radio terminal 1 as a result of the above-mentioned scheduling process, the actual transmission rate is lower than the defined transmission rate specified by the DRC.

The radio terminal 1 calculates a predictive transmission rate, which is a predictive value of a downlink transmission rate at a next frame, based on predictive reception quality. The radio terminal 1 transmits the calculated predictive transmission rate to the communication destination apparatus 40 through the radio base station 20 and the communication network 30. The radio base station 20 or the communication destination apparatus 40 controls a transmission rate and a coding rate of data, which is to be transmitted to the radio terminal 1, according to the received predictive transmission rate.

(2) First Embodiment

Next, the first embodiment of the radio terminal of the present invention will be described. Specifically, (2.1) Configuration of radio terminal according to first embodiment, (2.2) Operation of radio terminal according to first embodiment, and (2.3) Effect of first embodiment will be described.

(2.1) Configuration of Radio Terminal According to First Embodiment

Figure 5:
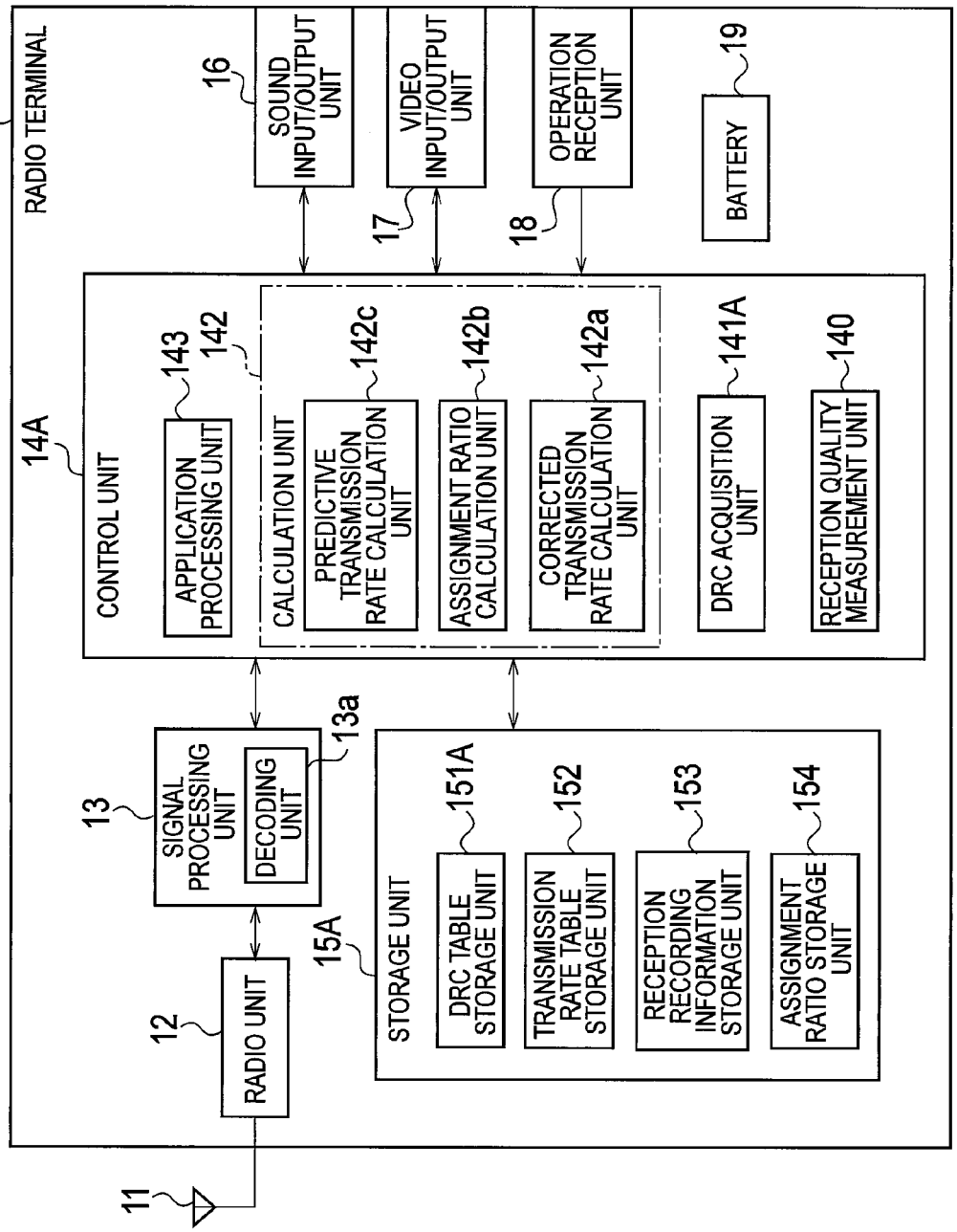
FIG. 5 is a block diagram illustrating the configuration of a radio terminal according to a first embodiment of the present invention.

FIG. 5 is a block diagram illustrating the configuration of the radio terminal 1. The configuration of the radio terminal 1 will be described in sequence of (2.1.1) Schematic configuration and (2.1.2) Configurations of control unit and storage unit.

(2.1.1) Schematic Configuration

As illustrated in FIG. 5, the radio terminal 1 includes an antenna 11, a radio unit 12, a signal processing unit 13, a control unit 14A, a storage unit 15A, a sound input/output unit 16, a video input/output unit 17, an operation reception unit 18, and a battery 19.

The radio unit 12 transmits/receives a radio signal through the antenna 11. Furthermore, the radio unit 12 converts the radio signal to a baseband signal, and inputs/outputs the baseband signal to the signal processing unit 13.

The signal processing unit 13 demodulates and encodes a reception signal (a reception baseband signal), and modulates and codes a transmission signal (a transmission baseband signal). The signal processing unit 13 includes a decoding unit 13a configured to decode data included in the radio signal received in the radio unit 12 from the radio base station 20. The signal processing unit 13 performs a process based on adaptive modulation and a process based on HARQ. That is, data not decoded by the decoding unit 13a is stored in the storage unit 15A, and is synthesized with retransmitted data.

The control unit 14A, for example, includes a CPU, and controls various functions of the radio terminal 1. The storage unit 15A, for example, includes a memory, and stores various types of information used for the control and the like of the control unit 14A.

The sound input/output unit 16, for example, includes a microphone configured to input a sound signal to the control unit 14A based on collected sound, and a speaker configured to output sound based on the sound signal from the control unit 14A.

The video input/output unit 17, for example, includes a display configured to output a character or a video, and a camera configured to input a video signal obtained by photographing an object to the control unit 14A.

The operation reception unit 18, for example, includes a numerical keypad, a function key, a touch panel or the like, and receives a user's operation.

The battery 19 accumulates power to be supplied to the radio unit 12, the signal processing unit 13, the control unit 14A, the storage unit 15A, the sound input/output unit 16, the video input/output unit 17, and the operation reception unit 18.

(2.1.2) Configurations of Control Unit and Storage Unit

Next, the configurations of the control unit 14A and the storage unit 15A will be described.

The control unit 14A includes a reception quality measurement unit 140, a DRC acquisition unit 141A, a calculation unit 142, and an application processing unit 143. The application processing unit 143, for example, processes an application such as a VoIP (Voice over Internet Protocol) application or a video streaming application.

The calculation unit 142 includes a corrected transmission rate calculation unit 142a, an assignment ratio calculation unit 142b, and a predictive transmission rate calculation unit 142c. The storage unit 15A includes a DRC table storage unit 151A, a transmission rate table storage unit 152, a reception recording information storage unit 153, and an assignment ratio storage unit 154.

The DRC table storage unit 151A stores a DRC table in which the reception quality (the SINR or the CIR) has been associated with a DRC. In the DRC table, one DRC has been associated with a predetermined range of reception quality.

The transmission rate table storage unit 152 stores a transmission rate table (refer to FIG. 4), in which the DRC has been associated with the defined transmission rate, in an initial state. The transmission rate table stored in the transmission rate table storage unit 152 is updated by the corrected transmission rate calculation unit 142a.

The reception quality measurement unit 140 periodically (for example, every frame or every slot) measures the reception quality of the radio signal received from the radio base station 20.

The DRC acquisition unit 141A calculates predictive reception quality based on present and previous reception quality measured by the reception quality measurement unit 140, and acquires a DRC corresponding to the calculated predictive reception quality from the DRC table storage unit 151A. To calculate the predictive reception quality, for example, a calculation method such as linear prediction is used.

The corrected transmission rate calculation unit 142a calculates a corrected transmission rate based on reception recording information stored in the reception recording information storage unit 153, and the defined transmission rate stored in the transmission rate table storage unit 152. The corrected transmission rate is a downlink transmission rate obtained by reflecting the probability that the decoding unit 13a succeeds (early termination) in decoding data using only some of the slots and the defined transmission rate as a downlink transmission rate when all the slots are used. The reception recording information is obtained by recording a reception state, a decoding success state and the like for each DRC. The reception recording information may be stored in the reception recording information storage unit 153 by the control unit 14A, or may be stored in the reception recording information storage unit 153 in advance.

FIG. 6 is a diagram explaining the corrected transmission rate. FIG. 6(a) illustrates correspondence relation between the DRC and the defined transmission rate, and FIG. 6(b) illustrates correspondence relation between the DRC and the corrected transmission rate. When a defined transmission rate and a corrected transmission rate corresponding to the same DRC are compared with each other, the corrected transmission rate is higher than the defined transmission rate. For example, a corrected transmission rate "40 bps" corresponding to DRC "1" is higher than a defined transmission rate "38.4 bps" corresponding to DRC "1". However, for DRCs (DRCs "6", "9", "11", "12", and "14") associated with the maximum slot number of 1 illustrated in FIG. 4, a defined transmission rate is equal to a corrected transmission rate as illustrated in FIG. 6. This is because the early termination does not occur when the maximum slot number is 1.

In relation to all slots assignable by the radio base station 20 in a previous predetermined period, the assignment ratio calculation unit 142b calculates an assignment ratio indicating a ratio by which a slot assigned to the radio terminal 1 occupies in the predetermined period.

Figure 7:
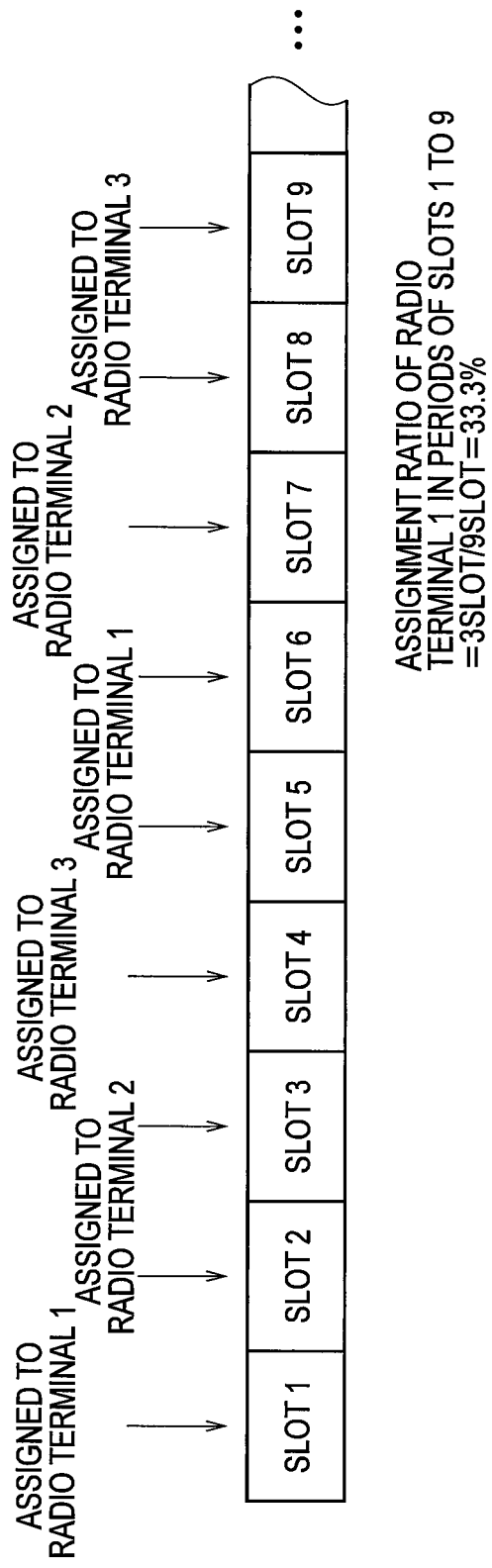
FIG. 7 is a diagram illustrating a calculation example of an assignment ratio according to the embodiment of the present invention.

FIG. 7 is a diagram illustrating a calculation example of the assignment ratio. In the example of FIG. 7, slots 1 and 5 are assigned to the radio terminal 1, slots 2, 3 and 7 are assigned to the radio terminal 2, and slots 4, 8 and 9 are assigned to a radio terminal 3. When a predetermined period is employed as the period of the slots 1 to 9, an assignment ratio of the radio terminal 1 is 33.3%.

The assignment ratio calculation unit 142b calculates an assignment ratio every predetermined period. The assignment ratio calculation unit 142b stores an average value (or a maximum value) of assignment ratios, which are calculated in a setting period longer than the predetermined period (in the example of FIG. 7, a period of nine slots), in the assignment ratio storage unit 154. The setting period, for example, is about 5 times as long as the predetermined period. In addition, the assignment ratio calculation unit 142b may select whether to store the average value of the assignment ratios in the assignment ratio storage unit 154, or the maximum value of the assignment ratios in the assignment ratio storage unit 154 according to the type of the application processed by the application processing unit 143.

For example, in the case of using the "average value" of the assignment ratios, this case is suitable for data (sound data and the like) transmission in which an average transmission rate (a data rate) may be predicted, and data and the like requiring some degree of band guarantee are stably and preferentially transmitted. In the case of using the "maximum value" of the assignment ratios, this case is suitable for data (file download and the like through an FTP) in which a maximum transmission capability of a transmission path may be predicted, and high speed transmission is preferable even if the transmission is unstable. In the following embodiments, it is assumed that the average value of the assignment ratios is stored in the assignment ratio storage unit 154, and the average value of the assignment ratios will be referred to as an "average assignment ratio".

The predictive transmission rate calculation unit 142c calculates a predictive transmission rate when a request from the application processing unit 143 is received. The predictive transmission rate calculation unit 142c acquires a corrected transmission rate, which corresponds to the latest DRC acquired by the DRC acquisition unit 141A, from the transmission rate table storage unit 152, and calculates a multiplied result, as the predicted transmission rate, which is obtained by multiplying the acquired corrected transmission rate by the average assignment ratio stored in the assignment ratio storage unit 154. The predictive transmission rate calculated by the predictive transmission rate calculation unit 142c is transmitted to the communication destination apparatus 40 from the application processing unit 143.

(2.2) Operation of Radio Terminal According to First Embodiment

Next, the operation of the radio terminal 1 will be described in sequence of (2.2.1) Schematic operation, (2.2.2) Transmission rate table creation process, (2.2.3) Assignment ratio calculation process, and (2.2.4) Predictive transmission rate calculation process.

(2.2.1) Schematic Operation

Figure 8:
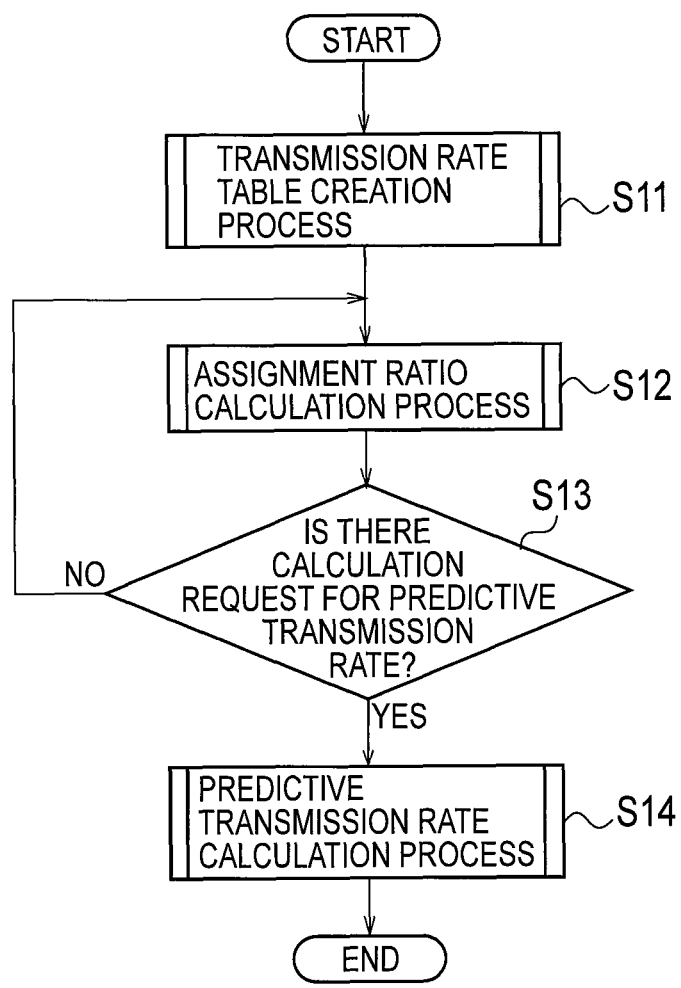
FIG. 8 is a flowchart illustrating the schematic operation of a radio terminal according to a first embodiment of the present invention.

FIG. 8 is a flowchart illustrating the schematic operation of the radio terminal 1 according to the first embodiment.

In step S11, the corrected transmission rate calculation unit 142a calculates a corrected transmission rate every DRC, creates a transmission rate table in which the DRC has been associated with the corrected transmission rate, and stores the created transmission rate table in the transmission rate table storage unit 152.

In step S12, the assignment ratio calculation unit 142b calculates the average assignment ratio, and stores the calculated average assignment ratio in the assignment ratio storage unit 154.

When the calculation of the predictive transmission rate is required by the application processing unit 143 (step S13; YES), the predictive transmission rate calculation unit 142c calculates the predictive transmission rate in consideration of early termination in step S14.

Meanwhile, when the calculation of the predictive transmission rate is not required by the application processing unit 143 (step S13; NO), the assignment ratio calculation unit 142b re-calculates the latest average assignment ratio, and stores the calculated average assignment ratio in the assignment ratio storage unit 154 in step S12.

In addition, the processes of steps S11, S12, S14 may be serial processes or parallel processes.

(2.2.2) Transmission Rate Table Creation Process

Figure 9:
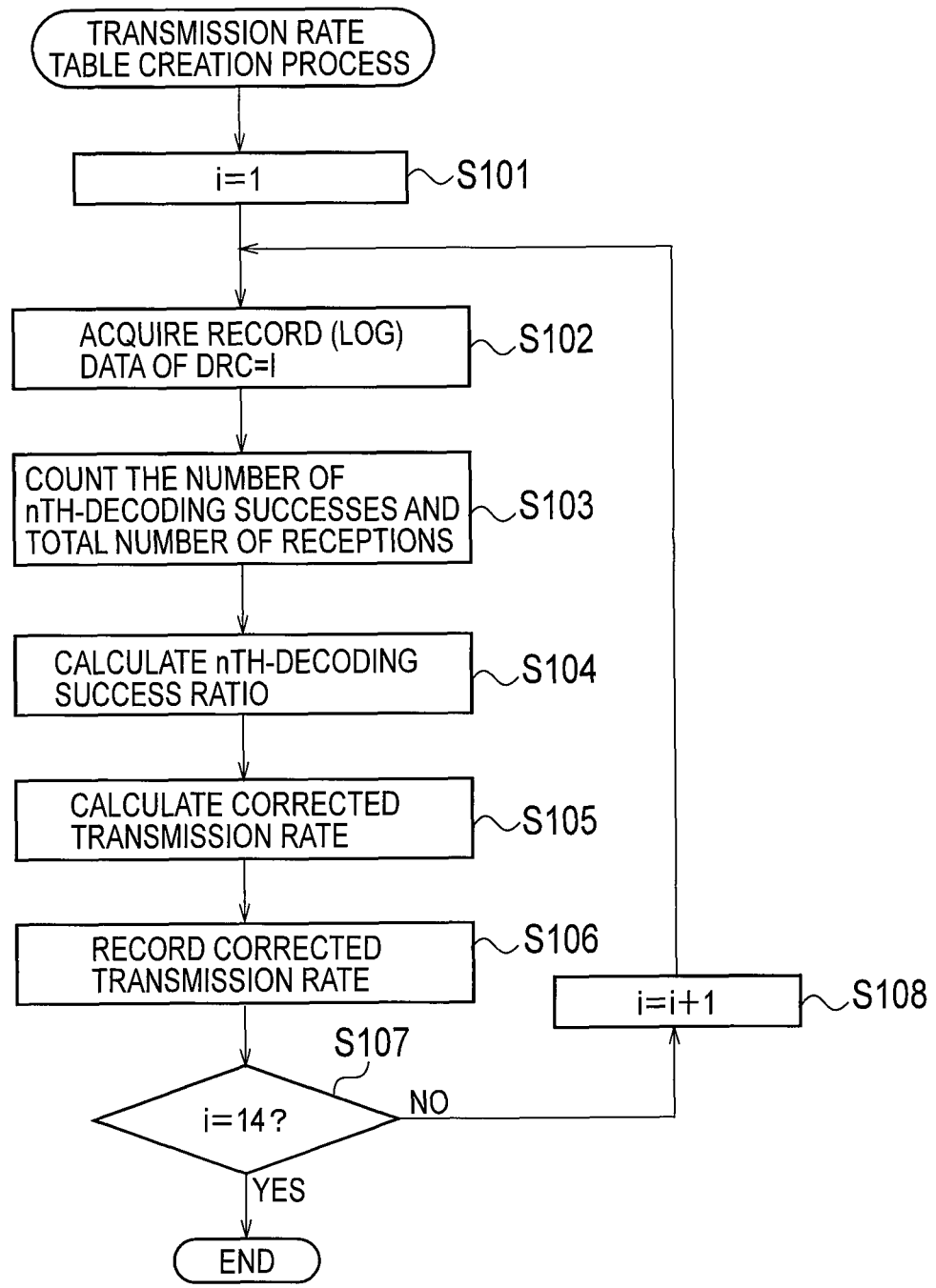
FIG. 9 is a flowchart illustrating the process flow of a transmission rate table creation process according to the first embodiment of the present invention.

FIG. 9 is a flowchart illustrating the process flow of the transmission rate table creation process according to the first embodiment.

In step S101, the corrected transmission rate calculation unit 142a sets a value i (1≤i≤14) indicating a DRC to 1.

In step S102, the corrected transmission rate calculation unit 142a acquires reception recording information corresponding to a DRC "i" from the reception recording information storage unit 153.

In step S103, the corrected transmission rate calculation unit 142a counts the succeeded number of decoding and the total number of receptions of an nth slot, out of the maximum slot number corresponding to the DRC "i", based on the reception recording information acquired from the reception recording information storage unit 153. Here, the succeeded number of decoding indicates the number of times by which the decoding unit 13a has succeeded in decoding at the nth slot, and the total number of receptions indicates a total number of the nth slot. For example, in the case of a DRC "1", since the maximum slot number is 16, the corrected transmission rate calculation unit 142a counts the succeeded number of decoding and the total number of receptions of all slots 1 to 16.

In step S104, the corrected transmission rate calculation unit 142a calculates a decoding success rate $P_{DRCn}$ of the nth slot from the succeeded number of decoding and the total number of receptions counted in step S103. The decoding success rate $P_{DRCn}$ of the nth slot is calculated as a ratio of the succeeded number of decoding with respect to the total number of receptions of the nth slot. For example, in the case of the DRC "1", the corrected transmission rate calculation unit 142a calculates decoding success rates of all slots 1 to 16.

In step S105, the corrected transmission rate calculation unit 142a calculates a corrected transmission rate $S_{DRC}$ corresponding to the DRC according to Equation 1 below.

$$S_{DRC} = \sum_{n=1}^{N_{DRC}} \left( T_{DRC} \times \frac{N_{DRC}}{n} \times P_{DRCn} \right) \quad \text{[Equation 1]}$$

In the Equation 1 above, the $N_{DRC}$ denotes a maximum slot number corresponding to the DRC. The $T_{DRC}$ denotes a defined transmission rate corresponding to the DRC. The $P_{DRCn}$ denotes a decoding success rate of the nth slot corresponding to the DRC.

In step S106, the corrected transmission rate calculation unit 142a associates the corrected transmission rate $S_{DRC}$ calculated in step S105 with the DRC, and stores the resultant corrected transmission rate in the transmission rate table storage unit 152.

In step S107, the corrected transmission rate calculation unit 142a determines whether the calculation of the corrected transmission rate $S_{DRC}$ has been completed for all DRCs. When the calculation is has completed, the corrected transmission rate calculation unit 142a adds 1 to i in step S108. Then, the process returns to step S102.

(2.2.3) Assignment Ratio Calculation Process

Figure 10:
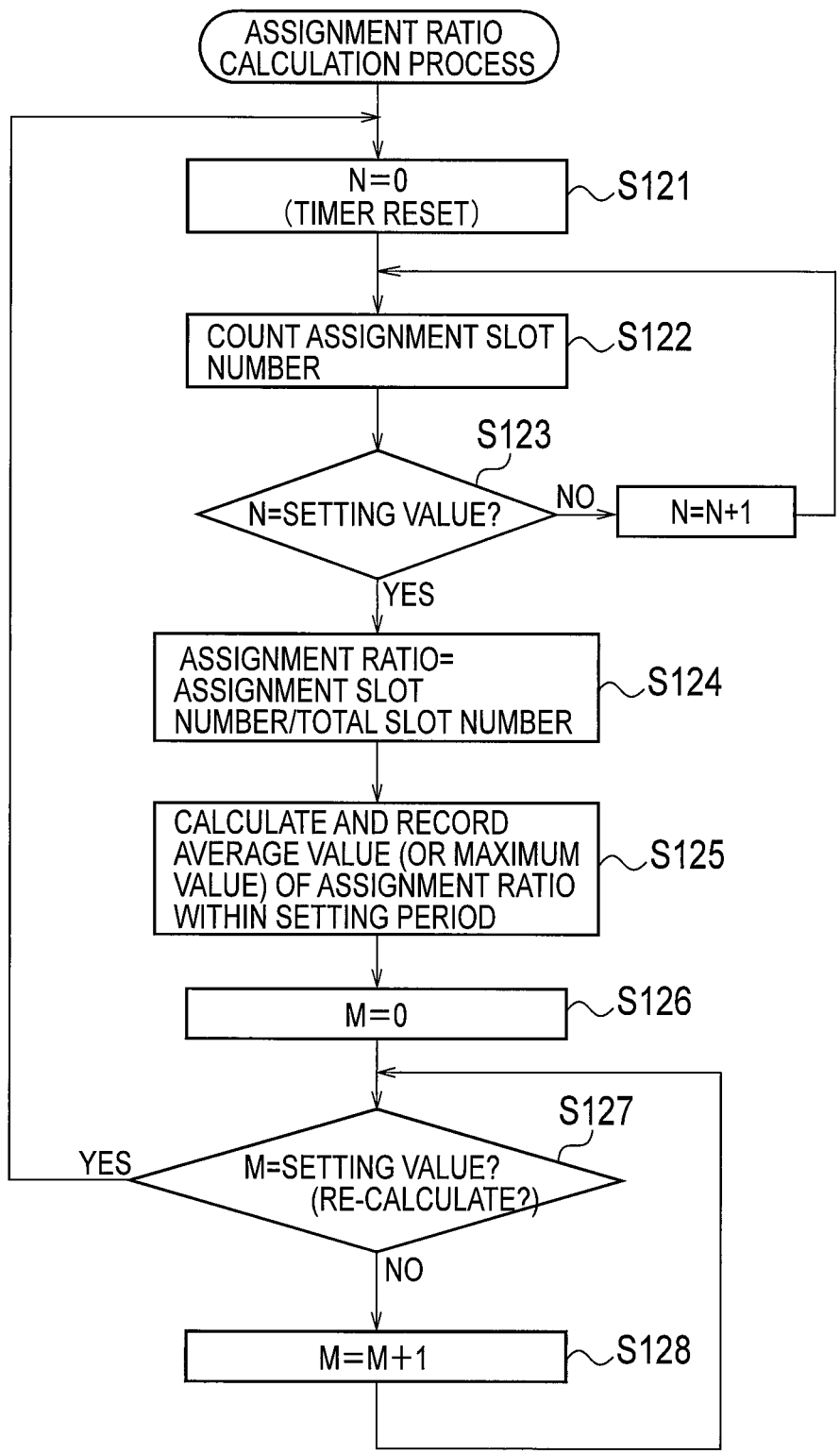
FIG. 10 is a flowchart illustrating the process flow of an assignment ratio calculation process according to the first embodiment of the present invention.

FIG. 10 is a flowchart illustrating the process flow of the assignment ratio calculation process according to the first embodiment.

In steps S121 to S123, the assignment ratio calculation unit 142b counts the number of slots assigned from the radio base station 20 in a predetermined period.

In step S124, the assignment ratio calculation unit 142b calculates assignment ratios in the predetermined period based on the number of counted slots.

In step S125, the assignment ratio calculation unit 142b calculates an average value of the assignment ratios (an average assignment ratio) calculated every predetermined period. The assignment ratio storage unit 154 stores the average assignment ratio calculated by the assignment ratio calculation unit 142b.

In steps S126 to S128, the assignment ratio calculation unit 142b waits for a predetermined time until it starts to calculate an assignment ratio in a next predetermined period, and starts to calculate the assignment ratio in the next predetermined period in step S121 after the predetermined time lapses.

In addition, instead of the timer in steps S126 to S128, the assignment ratio calculation process (steps S121 to S125) may be called by a command or a function and be performed.

(2.2.4) Predictive Transmission Rate Calculation Process

Figure 11:
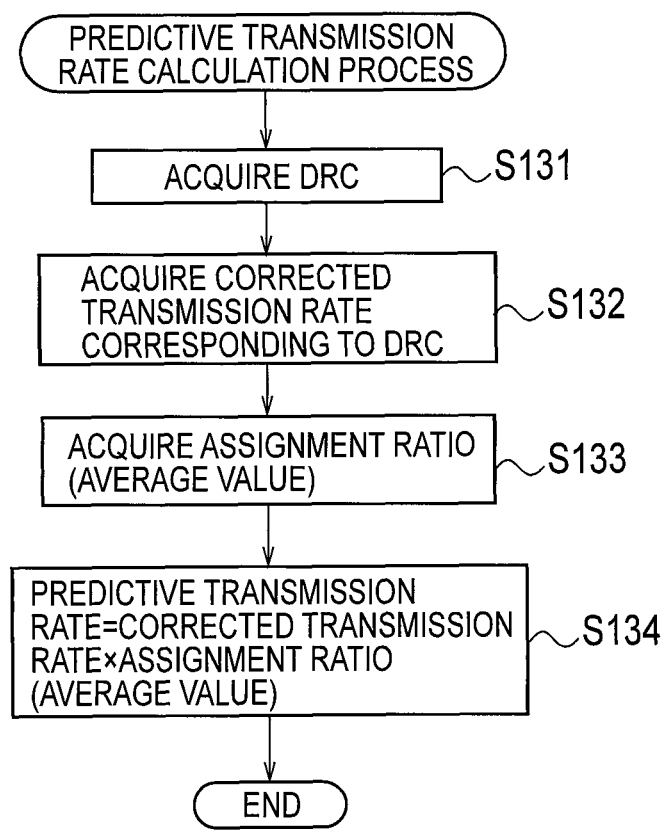
FIG. 11 is a flowchart illustrating the process flow of a predictive transmission rate calculation process according to the first embodiment of the present invention.

FIG. 11 is a flowchart illustrating the process flow of the predictive transmission rate calculation process according to the first embodiment.

In step S131, the DRC acquisition unit 141A acquires a DRC corresponding to predictive reception quality from the DRC table storage unit 151A.

In step S132, the predictive transmission rate calculation unit 142c acquires a corrected transmission rate $S_{DRC}$, which corresponds to the DRC acquired by the DRC acquisition unit 141A, from the transmission rate table storage unit 152.

In step S133, the predictive transmission rate calculation unit 142c acquires an average assignment ratio from the assignment ratio storage unit 154.

In step S134, the predictive transmission rate calculation unit 142c calculates a multiplied result, as a predictive transmission rate, which is obtained by multiplying the corrected transmission rate $S_{DRC}$ acquired from the transmission rate table storage unit 152 by the average assignment ratio acquired from the assignment ratio storage unit 154.

(2.3) Effect of First Embodiment

According to the first embodiment, the predictive transmission rate is calculated using the corrected transmission rate having reflected a transmission rate improvement effect due to the early termination in the HARQ, so that it is possible to accurately calculate the predictive transmission rate, as compared with the case in which the early termination is not considered.

Figure 12:
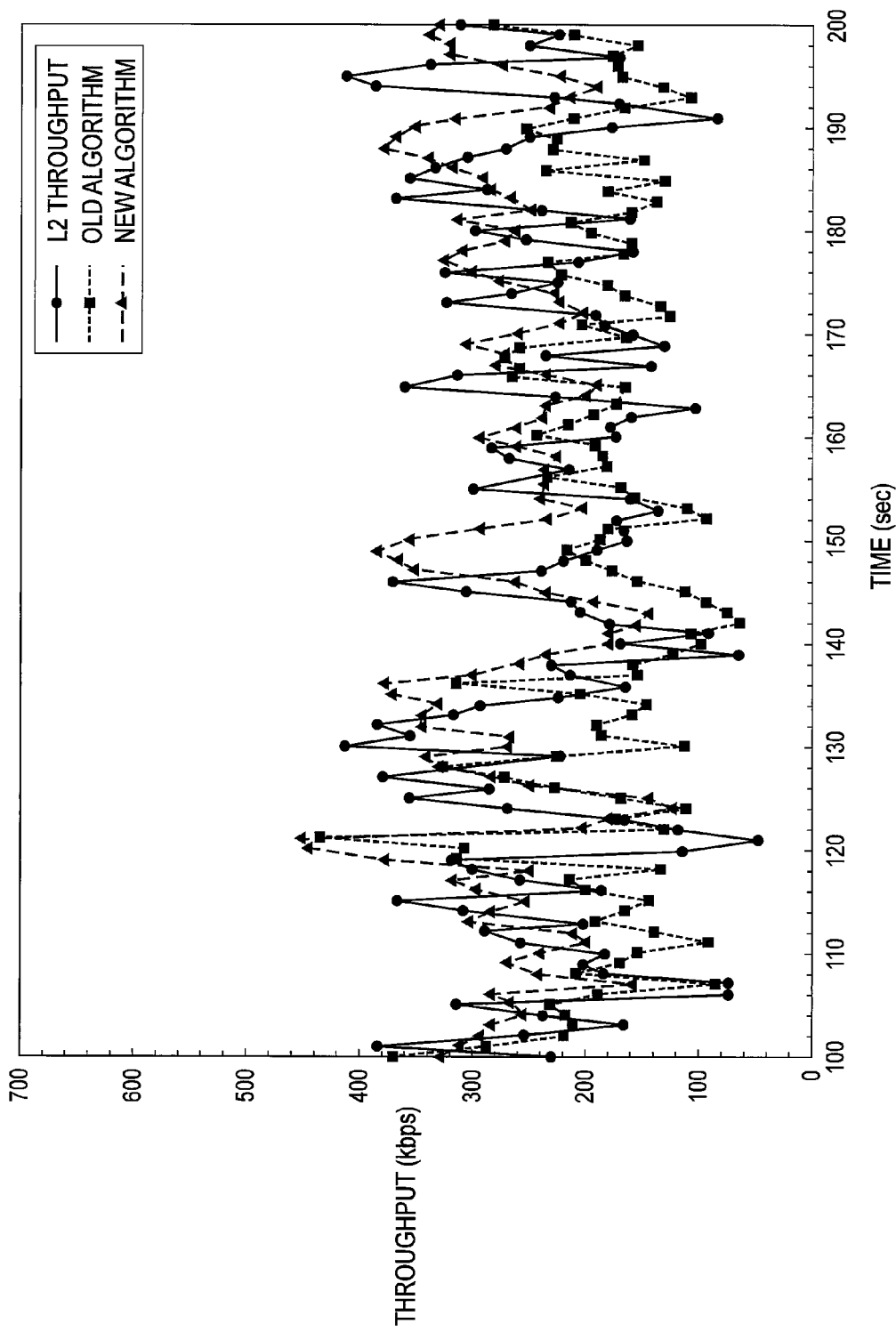
FIG. 12 is a diagram explaining the effect of the first embodiment of the present invention.

As illustrated in FIG. 12, in a transmission rate prediction method (New algorithm) when the early termination is considered, an error to an actual downlink transmission rate (L2 Throughput) is smaller, as compared with a transmission rate prediction method (Old algorithm) when the early termination is not considered.

Moreover, according to the first embodiment, the predictive transmission rate is calculated using the assignment ratio, so that the predictive transmission rate can be calculated in consideration of the state of the scheduling process of the radio base station 20, thereby accurately calculating the predictive transmission rate even when the amount of slots assigned to the radio terminal 1 from the radio base station 20 is dynamically changed.

(3) Second Embodiment

In the above-mentioned first embodiment, the corrected transmission rate $S_{DRC}$ calculated by the corrected transmission rate calculation unit 142a is not updated. However, in the second embodiment, the corrected transmission rate calculation unit 142a updates the corrected transmission rate $S_{DRC}$ in real-time.

Specifically, (3.1) Schematic operation of radio terminal according to second embodiment, (3.2) Transmission rate table creation process, and (3.3) Effect of second embodiment will be described. The second embodiment will be described while focusing on the difference relative to the first embodiment, redundant description will be omitted.

(3.1) Schematic Operation of Radio Terminal According to Second Embodiment

Figure 13:
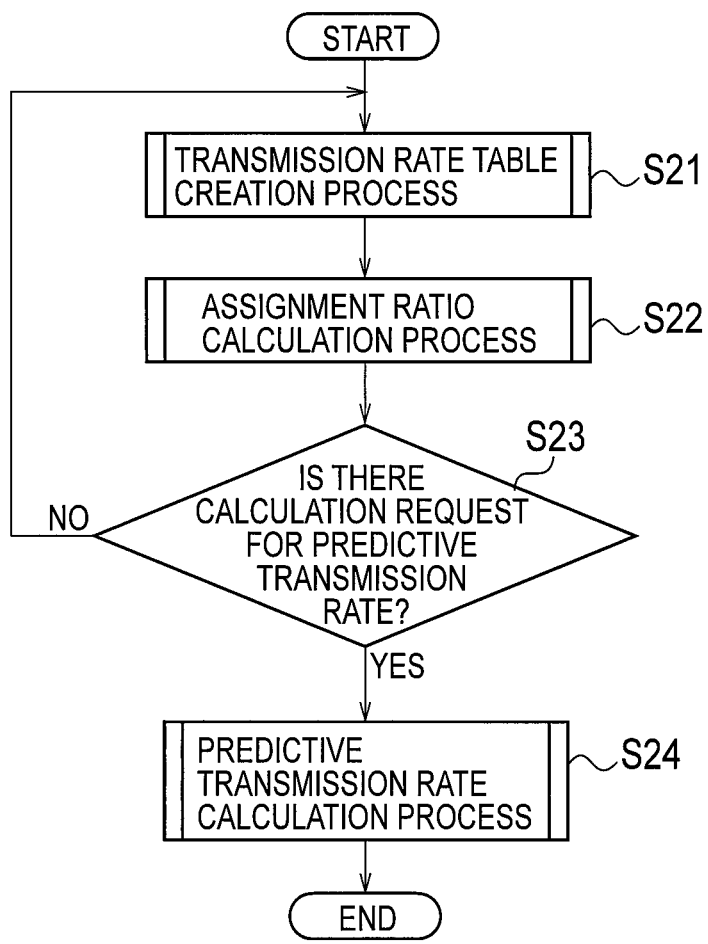
FIG. 13 is a flowchart illustrating the schematic operation of a radio terminal according to a second embodiment of the present invention.

FIG. 13 is a flowchart illustrating the schematic operation of the radio terminal 1 according to the second embodiment.

In step S21, the corrected transmission rate calculation unit 142a calculates the corrected transmission rate $S_{DRC}$ every DRC, creates a transmission rate table in which the DRC has been associated with the corrected transmission rate $S_{DRC}$, and stores the created transmission rate table in the transmission rate table storage unit 152.

In step S22, the assignment ratio calculation unit 142b calculates an average assignment ratio, and stores the calculated average assignment ratio in the assignment ratio storage unit 154.

When the calculation of a predictive transmission rate is required by the application processing unit 143 (step S23; YES), the predictive transmission rate calculation unit 142c calculates the predictive transmission rate in consideration of early termination in step S24.

Meanwhile, when the calculation of the predictive transmission rate is not required by the application processing unit 143 (step S23; NO), the corrected transmission rate calculation unit 142a re-calculates the corrected transmission rate $S_{DRC}$ every DRC, re-creates a transmission rate table in which the DRC has been associated with the corrected transmission rate $S_{DRC}$, and stores the created transmission rate table in the transmission rate table storage unit 152 in step S21.

In this way, the transmission rate table stored in the transmission rate table storage unit 152 is repeatedly updated. In addition, the processes of steps S21, S22, and S24 may be serial processes or parallel processes.

(3.2) Transmission Rate Table Creation Process

Figure 14:
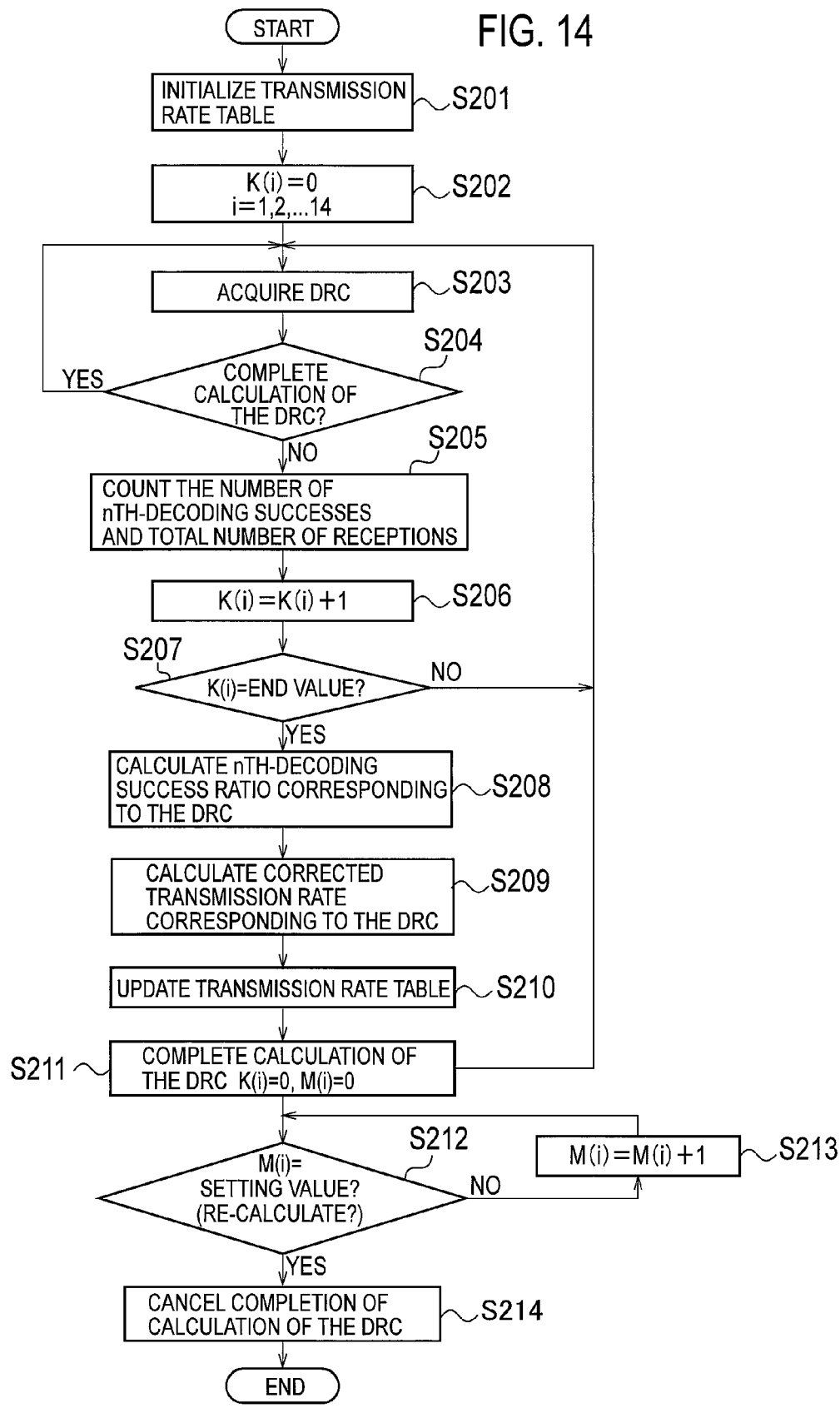
FIG. 14 is a flowchart illustrating the process flow of a transmission rate table creation process according to the second embodiment of the present invention.

FIG. 14 is a flowchart illustrating the process flow of the transmission rate table creation process according to the second embodiment.

In step S201, the corrected transmission rate calculation unit 142a initializes the transmission rate table stored in the transmission rate table storage unit 152.

In step S202, the corrected transmission rate calculation unit 142a sets a value K (i) for measuring a reception state in a predetermined period to 0.

In step S203, the DRC acquisition unit 141A acquires a DRC corresponding to predictive reception quality from the DRC table storage unit 151A.

When the update of the corrected transmission rate $S_{DRC}$ has not been completed for the DRC acquired by the DRC acquisition unit 141A (step S204; NO), the corrected transmission rate calculation unit 142a counts the succeeded number of decoding and the total number of receptions of an nth slot of the maximum slot number corresponding to the DRC acquired by the DRC acquisition unit 141A, in step S205. In step S206, the corrected transmission rate calculation unit 142a adds 1 to the value K (i). Meanwhile, when the update of the corrected transmission rate $S_{DRC}$ has been completed for the DRC acquired by the DRC acquisition unit 141A (step S204; YES), the DRC acquisition unit 141A newly acquires the DRC corresponding to the predictive reception quality from the DRC table storage unit 151A in step S203.

When the value K (i) has reached a predetermined value (an end value) (step S207; YES), the corrected transmission rate calculation unit 142a calculates a decoding success rate $P_{DRCn}$ of the nth slot corresponding to the DRC from the succeeded number of decoding and the total number of receptions, which have been counted in step S205, in step S208. Meanwhile, when the value K (i) has not reached the predetermined value (the end value) (step S207; NO), the DRC acquisition unit 141A newly acquires the DRC corresponding to the predictive reception quality from the DRC table storage unit 151A in step S203.

In step S209, the corrected transmission rate calculation unit 142a calculates the corrected transmission rate $S_{DRC}$ corresponding to the DRC by using the decoding success rate $P_{DRCn}$, which has been calculated in step S208, according to the Equation 1 above.

In step S210, the corrected transmission rate calculation unit 142a associates the corrected transmission rate $S_{DRC}$ calculated in step S209 with the DRC, and stores (updates) the resultant corrected transmission rate in the transmission rate table storage unit 152.

In step S211, the corrected transmission rate calculation unit 142a completes the update of the corrected transmission rate $S_{DRC}$ for the DRC, and sets the value K (i) and M (i) to 0. Then, the process returns to step S203.

In steps S212 and S213, the corrected transmission rate calculation unit 142a waits for a predetermined time until it starts next corrected transmission rate update for the DRC, and releases the calculation completion for the DRC after the predetermined time lapses in step S214.

(3.3) Effect of Second Embodiment

According to the second embodiment, the corrected transmission rate calculation unit 142a repeatedly updates the corrected transmission rate $S_{DRC}$ in real-time, so that it is possible to calculate the predictive transmission rate based on the corrected transmission rate $S_{DRC}$ adaptive to communication environment of the radio terminal 1 even when the communication environment of the radio terminal 1 changes every moment, thereby accurately calculating the predictive transmission rate.

(4) Third Embodiment

In the above-mentioned second embodiment, the corrected transmission rate calculation unit 142a calculates and updates the corrected transmission rate $S_{DRC}$ in real-time. However, at the time point at which reception results are not sufficient, it is assumed that the accuracy of the calculated corrected transmission rate $S_{DRC}$ is reduced.

In this regard, according to the third embodiment, in transition until reception results are sufficiently obtained for a certain DRC, the corrected transmission rate calculation unit 142a calculates a weighted average of the defined transmission rate corresponding to the DRC and the corrected transmission rate $S_{DRC}$ corresponding to the DRC, and stores the corrected transmission rate $S_{DRC}$ after the weighted averaging in the transmission rate table storage unit 152.

Hereinafter, (4.1) Operation of radio terminal according to third embodiment and (4.2) Effect of third embodiment will be described. The third embodiment will be described while focusing on the difference relative to the first embodiment and the second embodiment, redundant description will be omitted.

(4.1) Operation of Radio Terminal According to Third Embodiment

Figure 15:
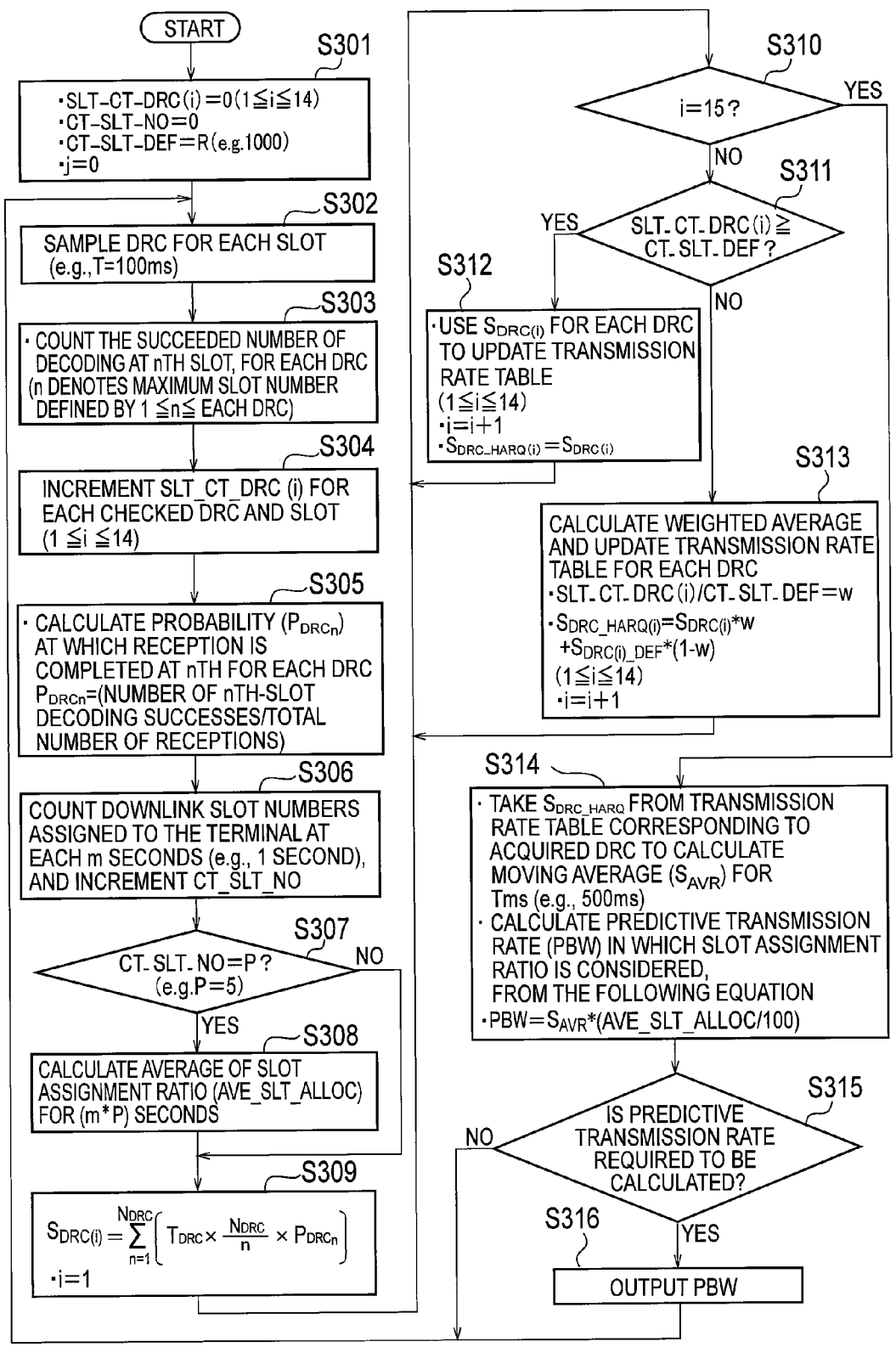
FIG. 15 is a flowchart illustrating the operation of a radio terminal according to a third embodiment of the present invention.

FIG. 15 is a flowchart illustrating the operation of the radio terminal 1 according to the third embodiment.

In step S301, the corrected transmission rate calculation unit 142a sets a value SLT_CT_DRC (i) for counting the number of processed slots every DRC to 0, sets a value CT_SLT_NO for counting the number of slots assigned to the radio terminal 1 to 0, and sets a value CT_SLT_DEF to be compared with the value SLT_CT_DRC (i) to R (for example, 1000).

In step S302, the DRC acquisition unit 141A acquires (samples) a DRC corresponding to predictive reception quality from the DRC table storage unit 151A.

In step S303, the corrected transmission rate calculation unit 142a counts the succeeded number of decoding of an nth slot of the maximum slot number corresponding to the DRC acquired by the DRC acquisition unit 141A.

In step S304, the corrected transmission rate calculation unit 142a increments (adds 1) the SLT_CT_DRC (i) every DRC and slot.

In step S305, the corrected transmission rate calculation unit 142a calculates a decoding success rate $P_{DRCn}$ of the nth slot corresponding to the DRC.

In step S306, the assignment ratio calculation unit 142b counts the number of slots assigned to the radio terminal 1 every m seconds (for example, 1 second), and increments the CT_SLT_NO.

When the CT_SLT_NO has reached P (for example, 5) (step S307; YES), the assignment ratio calculation unit 142b calculates an average assignment ratio (AVE_SLT_ALLOC) for (m×P) seconds in step S308.

In step S309, the corrected transmission rate calculation unit 142a calculates a corrected transmission rate $S_{DRC}$ according to the Equation 1 above.

When i has not reached 15, that is, when the corrected transmission rate $S_{DRC}$ has not been calculated for all DRCs (step S310; NO) and the SLT_CT_DRC (i) is equal to or more than the CT_SLT_DEF (step S311; YES), the corrected transmission rate calculation unit 142a updates a corrected transmission rate $S_{DRC\_HARQ}$ in a transmission rate table by using the calculated corrected transmission rate $S_{DRC}$ in step S312.

When the i has not reached 15 (step S310; NO) and the SLT_CT_DRC (i) is smaller than the CT_SLT_DEF (step S311; NO), the corrected transmission rate calculation unit 142a calculates a weighted average of a defined transmission rate $S_{DRC\_DEF}$ and the corrected transmission rate $S_{DRC}$ according to the degree by which the SLT_CT_DRC (i) approximates to the CT_SLT_DEF, and updates the transmission rate table by using the corrected transmission rate $S_{DRC\_HARQ}$ after the weighted averaging in step S313.

Meanwhile, when the i has reached 15 (step S310; YES), the predictive transmission rate calculation unit 142c acquires the corrected transmission rate $S_{DRC\_HARQ}$ corresponding to the DRC from the transmission rate table storage unit 152, and calculates a moving average ($S_{AVE}$) for T (for example, 500) ms. Furthermore, the predictive transmission rate calculation unit 142c calculates a multiplied result, as a predictive transmission rate (PBW), which is obtained by multiplying the $S_{AVE}$ by the AVE_SLT_ALLOC.

When the predictive transmission rate is required to be calculated (step S315; YES), the predictive transmission rate calculation unit 142c outputs the calculated predictive transmission rate (PBW) in step S316.

(4.2) Effect of Third Embodiment

According to the third embodiment, the weighted average of the defined transmission rate $S_{DRC\_DEF}$ and the corrected transmission rate $S_{DRC}$ is calculated. Specifically, as the SLT_CT_DRC (i), which corresponds to the number of processed slots every DRC, approximates to the prescribed number CT_SLT_DEF, the weight of the corrected transmission rate $S_{DRC}$ is increased. The transmission rate table is updated using the corrected transmission rate $S_{DRC\_HARQ}$ after such weighted averaging, so that it is possible to reduce the probability that the accuracy of a corrected transmission rate is reduced in transition until reception results are sufficiently obtained.

(5) Fourth Embodiment

Next, the fourth embodiment of the radio terminal of the present invention will be described. In the above-mentioned first to third embodiments, only one transmission rate table is used. However, in the fourth embodiment, a transmission rate table is used in each range of reception quality.

Hereinafter, (5.1) Configuration of radio terminal according to fourth embodiment, (5.2) Operation of radio terminal according to fourth embodiment, and (5.3) Effect of fourth embodiment will be described. The fourth embodiment will be described while focusing on the difference relative to the first to third embodiments, redundant description will be omitted.

(5.1) Configuration of Radio Terminal According to Fourth Embodiment

In the radio terminal 1 according to the fourth embodiment, the configuration of the transmission rate table stored in the transmission rate table storage unit 152 is different from those in the first to third embodiments. As illustrated in FIG. 16, the transmission rate table storage unit 152 in the fourth embodiment stores the transmission rate table, in which the DRC has been associated with the corrected transmission rate $S_{DRC}$, in each range of reception quality (an SINR in the example of FIG. 16).

In the example of FIG. 16, created are threes transmission rate tables, that is, a transmission rate table used when the SINR measured by the reception quality measurement unit 140 is −12 dB to −10 dB, a transmission rate table used when the SINR is −10 dB to −8 dB, and a transmission rate table used when the SINR is in −8 dB to −6 dB.

An example of a creation procedure of such a transmission rate table will be described. The corrected transmission rate calculation unit 142a calculates the corrected transmission rate $S_{DRC}$ in real-time in the same manner as the second embodiment. The corrected transmission rate calculation unit 142a creates a transmission rate table in which the DRC acquired by the DRC acquisition unit 141A, the calculated corrected transmission rate, and the reception quality measured by the reception quality measurement unit 140 have been associated with one another, and stores the created transmission rate table in the transmission rate table storage unit 152.

Note that in the above-described embodiment, a plurality of tables are associated (for example, the SINR=−10 dB). In this case, an association with any one table may suffice.

(5.2) Operation of Radio Terminal According to Fourth Embodiment

Figure 17:
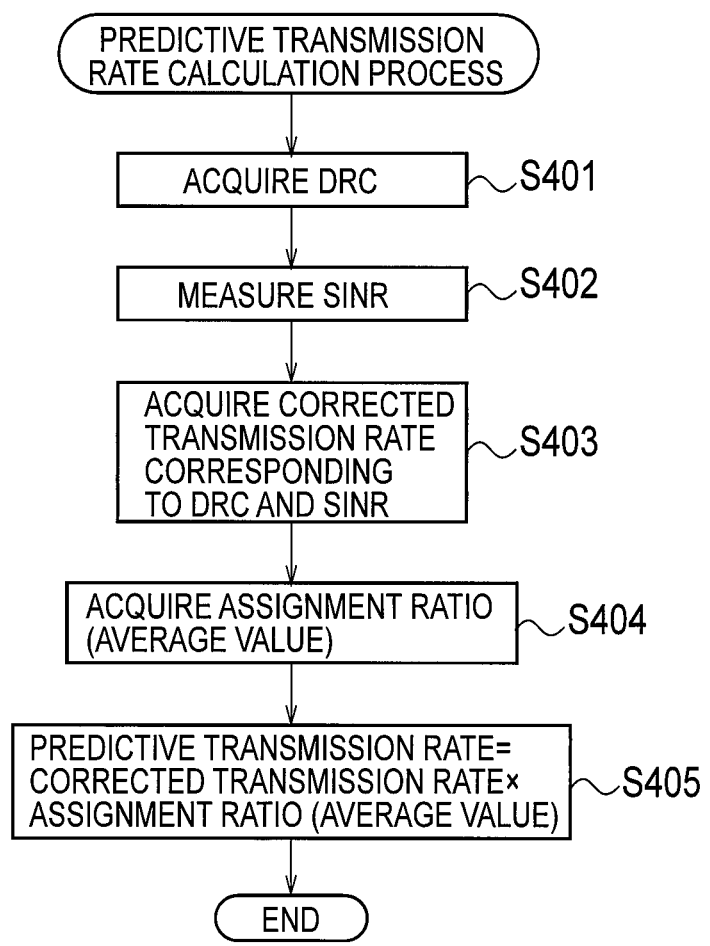
FIG. 17 is a flowchart illustrating the process flow of a predictive transmission rate calculation process according to the fourth embodiment of the present invention.

FIG. 17 is a flowchart illustrating the process flow of the predictive transmission rate calculation process according to the fourth embodiment.

In step S401, the DRC acquisition unit 141A acquires a DRC corresponding to predictive reception quality from the DRC table storage unit 151A.

In step S402, the reception quality measurement unit 140 measures the reception quality of a reception signal from the radio base station 20.

In step S403, the predictive transmission rate calculation unit 142c acquires a corrected transmission rate, which corresponds to the DRC acquired by the DRC acquisition unit 141A and the reception quality measured by the reception quality measurement unit 140, from the transmission rate table storage unit 152. Specifically, the predictive transmission rate calculation unit 142c specifies a transmission rate table, which corresponds to the reception quality measured by the reception quality measurement unit 140, from the transmission rate tables, and acquires a corrected transmission rate, which corresponds to the DRC acquired by the DRC acquisition unit 141A, in the specified transmission rate table.

In step S404, the predictive transmission rate calculation unit 142c acquires an average assignment ratio from the assignment ratio storage unit 154.

In step S405, the predictive transmission rate calculation unit 142c calculates a multiplied result, as a predictive transmission rate, which is obtained by multiplying the corrected transmission rate acquired from the transmission rate table storage unit 152 by the average assignment ratio acquired from the assignment ratio storage unit 154.

(5.3) Effect of Fourth Embodiment

According to the fourth embodiment, it is possible to use the corrected transmission rate appropriate for current reception quality in the calculation of the predictive transmission rate, thereby accurately calculating the predictive transmission rate.

(4) Other Embodiments

Thus, the present invention has been described with the embodiments. However, it should be understood that those descriptions and drawings constituting a part of the present disclosure do not limit the present invention. From this disclosure, a variety of alternate embodiments, examples, and applicable techniques will become apparent to one skilled in the art.

(6.1) Modification of First Embodiment

In the above-mentioned first embodiment, the transmission rate table storage unit 152 stores the transmission rate table (refer to FIG. 4), in which the DRC has been associated with the defined transmission rate, in the initial state. However, the transmission rate table storage unit 152 may also store in advance the transmission rate table (refer to FIG. 6(b)) in which the DRC has been associated with the corrected transmission rate.

That is, the transmission rate table, in which the DRC has been associated with the corrected transmission rate, may be stored at the time of shipment of the radio terminal 1, and may not be updated by the radio terminal 1. According to such an embodiment, adaptability to environment is reduced, but a process load of the radio terminal 1 can be reduced.

(6.2) Modification of Assignment Ratio Calculation Subject

In the above-mentioned first to fourth embodiments, the assignment ratio calculation unit 142b of the radio terminal 1 calculates the average value or the maximum value of the assignment ratios. However, the radio base station 20 may also calculate the average value or the maximum value, and the calculated average value or maximum value may also be transmitted from the radio base station 20 to the radio terminal 1.

With such a configuration, overhead is increased as compared with the first to fourth embodiments. However, since it is possible to remove the assignment ratio calculation unit 142b of the radio terminal 1, a process load of the radio terminal 1 can be reduced.

(6.3) Application to OFDMA System

In the above-mentioned first to fourth embodiments, the EV-DO radio communication system has been described. However, the present invention is not limited to the EV-DO. For example, the present invention can be applied to a radio communication system (hereinafter, referred to as an "OFDMA system") employing OFDMA (Orthogonal Frequency Division Multiple Access).

Such an OFDMA system, for example, includes LTE (Long Term Evolution) standardized in the 3GPP (3rd Generation Partnership Project), WiMAX standardized in the IEEE 802.16 and the like, and so on.

In these OFDMA systems, a DRC (an index value of a downlink transmission rate) is not transmitted from the radio terminal 1 to the radio base station 20, and a CQI (Channel Quality Indicator), which is an index value of reception quality of a radio signal received in the radio terminal 1, is transmitted from the radio terminal 1 to the radio base station 20.

Figure 18:
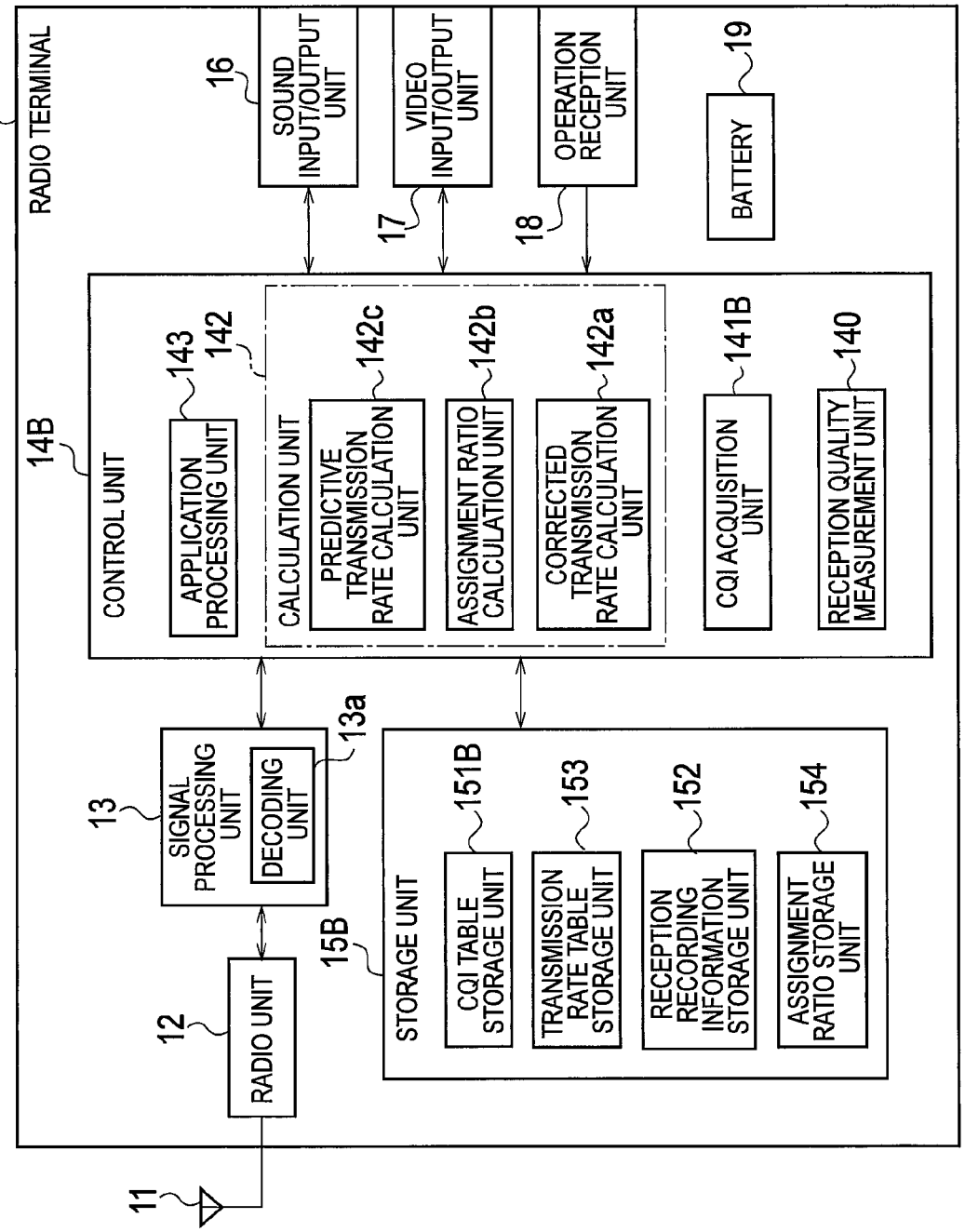
FIG. 18 is a block diagram illustrating a configuration example when the radio terminal according to the first embodiment of the present invention is applied to an OFDMA system.

The above-mentioned embodiments can be changed as follows and applied to the OFDMA system. FIG. 18 is a block diagram of the radio terminal 1 when the first embodiment is applied to the OFDMA system.

A CQI table storage unit 151B illustrated in FIG. 18 stores a CQI table associated with reception quality and a CQI. A transmission rate table storage unit 152 stores a transmission rate table associated with the CQI and a defined transmission rate. A corrected transmission rate calculation unit 142a calculates a corrected transmission rate every CQI in the same manner as the first to fourth embodiments, and stores a transmission rate table, in which the calculated corrected transmission rate has been associated with the CQI, in the transmission rate table storage unit 152. A CQI acquisition unit 141B calculates predictive reception quality, and acquires a CQI corresponding to the calculated predictive reception quality from a CQI table storage unit 151B. A predictive transmission rate calculation unit 142c acquires a corrected transmission rate, which corresponds to the CQI acquired by the CQI acquisition unit 141B, from the transmission rate table storage unit 152, acquires an average assignment ratio (or a maximum value) from an assignment ratio storage unit 154, and calculates a multiplied result, as a predictive transmission rate, which is obtained by multiplying the acquired corrected transmission rate by the acquired average assignment ratio.

Figure 19:
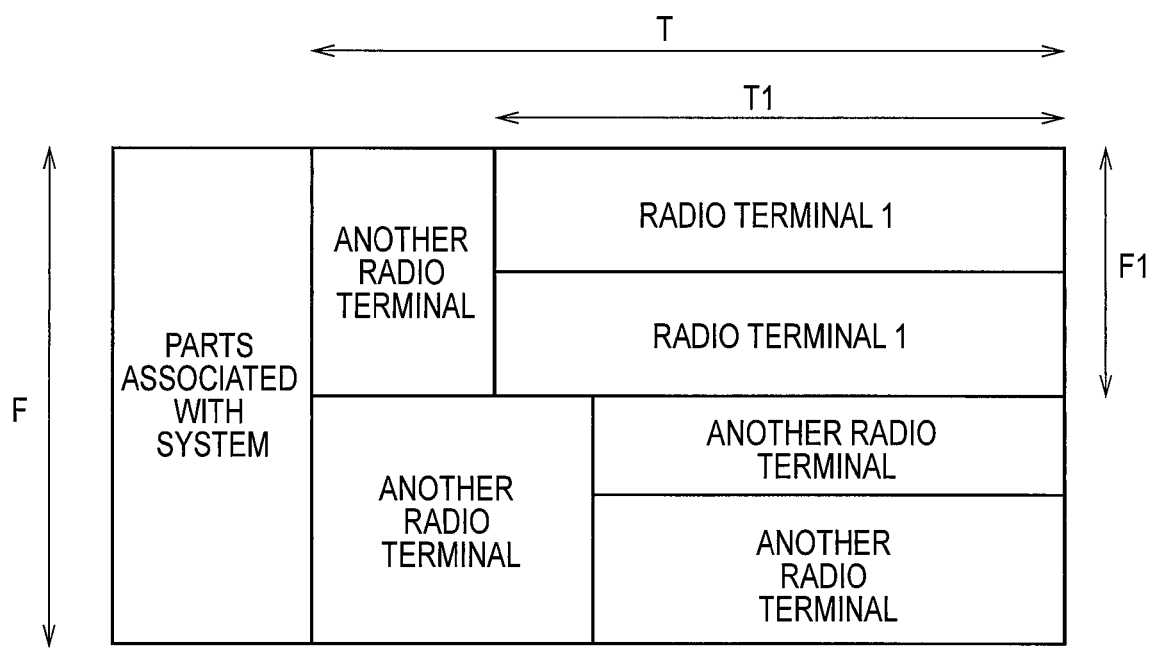
FIG. 19 is a diagram explaining an assignment ratio calculation process in the OFDM system.

As illustrated in FIG. 19, an assignment ratio calculation unit 142b, for example, calculates an assignment ratio indicating a ratio by which a downlink communication channel (T1×F1) assigned to a radio terminal 1D occupies in all downlink communication channels (T×F) assignable by the radio base station 20 in one frame (a predetermined period). In the OFDMA system, a downlink communication channel includes a combination of a frequency (a sub-channel) and a slot, and is called a resource block (RB) in the LTE.

(6.3) Modification of Ratio Terminal

In the above-mentioned first to fourth embodiments, a mobile phone terminal is used as the radio terminal 1. However, the present invention is not limited to the mobile phone terminal. For example, the radio terminal 1 may also include a card type radio terminal, a terminal having a radio communication device therein, and the like.

Thus, it must be understood that the present invention includes various embodiments that are not described herein. Further, each of the embodiments can be implemented independently, and besides, can be implemented in an appropriate combination. Therefore, the present invention is limited only by the specific features of the invention in the scope of the claims reasonably evident from the disclosure above.

The entire contents of Japanese Patent Application No. 2009-177109 (filed on Jul. 29, 2009) are incorporated in the present specification by reference.

Industrial Applicability

As described above, in accordance with the radio terminal and the transmission rate prediction method according to the present invention, even when the maximum slot number is dynamically changed according to reception quality in the radio terminal, since it is possible to accurately calculate a predictive transmission rate, the radio terminal and the transmission rate prediction method are available for radio communication such as mobile communication.

The invention claimed is:

1. A radio terminal that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station, the radio terminal comprising:
- a decoding unit configured to decode data included in the received downlink radio signal;
- a storage unit configured to associate a corrected transmission rate with any one index value of the downlink transmission rate or the reception quality and store the resultant corrected transmission rate, wherein the corrected transmission rate is calculated from a probability that the decoding unit succeeds in decoding data in some of the slots and a defined transmission rate as a downlink transmission rate when all the slots are used; and
- a calculation unit configured to predict reception quality at the future time based on reception quality before the reception time, acquire the corrected transmission rate which is associated with the index value of the predicted reception quality from the storage unit, and calculate the predictive transmission rate from the acquired corrected transmission rate, wherein
- the calculation unit calculates a decoding success rate, which indicates probability that the decoding unit succeeds in data decoding at an nth downlink time slot of all the slots, for each index value, and calculates the corrected transmission rate from the calculated decoding success rate and the defined transmission rate for each index value, and
- the storage unit associates the corrected transmission rate calculated by the calculation unit with the index value, and stores the resultant corrected transmission rate.

2. The radio terminal according to claim 1, wherein the calculation unit calculates the corrected transmission rate $S_{DRC}$ according to the following equation, when the index value is a DRC, the maximum slot number is $N_{DRC}$, the defined transmission rate is $T_{DRC}$, and the decoding success rate at the nth downlink time slot is $P_{DRCn}$:

$$S_{DRC} = \sum_{n=1}^{N_{DRC}} \left( T_{DRC} \times \frac{N_{DRC}}{n} \times P_{DRCn} \right).$$

3. The radio terminal according to claim 1, wherein the calculation unit counts a succeeded number of decoding which is a number of times by which the decoding unit succeeds in data decoding at the nth downlink time slot, for each index value, and calculates a ratio of the succeeded number of decoding with respect to a total number of receptions of the nth downlink time slot as the decoding success rate.

4. The radio terminal according to claim 3, wherein the calculation unit repeatedly calculates the corrected transmission rate for each index value in real-time.

5. The radio terminal according to claim 3, wherein
- the storage unit stores the defined transmission rate in addition to the corrected transmission rate,
- the calculation unit calculates a weighted average of the corrected transmission rate and the defined transmission rate, and
- the storage unit stores the corrected transmission rate after the weighted averaging.

6. A radio terminal that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station, the radio terminal comprising:
- a decoding unit configured to decode data included in the received downlink radio signal;
- a storage unit configured to associate a corrected transmission rate with any one index value of the downlink transmission rate or the reception quality and store the resultant corrected transmission rate, wherein the corrected transmission rate is calculated from a probability that the decoding unit succeeds in decoding data in some of the slots and a defined transmission rate as a downlink transmission rate when all the slots are used; and
- a calculation unit configured to predict reception quality at the future time based on reception quality before the reception time, acquire the corrected transmission rate which is associated with the index value of the predicted reception quality from the storage unit, and calculate the predictive transmission rate from the acquired corrected transmission rate, wherein
- the storage unit stores correspondence between the index value and the corrected transmission rate for each reception quality, and
- the calculation unit
    - acquires the corrected transmission rate from the correspondence stored in the storage unit, which corresponds to the index value according to the predicted reception quality according to the reception quality of the received radio signal, and
    - calculates the predictive transmission rate from the acquired corrected transmission rate.

7. A radio terminal that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station, the radio terminal comprising:
- a decoding unit configured to decode data included in the received downlink radio signal;
- a storage unit configured to associate a corrected transmission rate with any one index value of the downlink transmission rate or the reception quality and store the resultant corrected transmission rate, wherein the corrected transmission rate is calculated from a probability that the decoding unit succeeds in decoding data in some of the slots and a defined transmission rate as a downlink transmission rate when all the slots are used; and
- a calculation unit configured to predict reception quality at the future time based on reception quality before the reception time, acquire the corrected transmission rate which is associated with the index value of the predicted reception quality from the storage unit, and calculate the predictive transmission rate from the acquired corrected transmission rate, wherein
- the calculation unit
    - calculates assignment ratios indicating an occupying ratio of a downlink time slot assigned to the radio terminal in a predetermined period in all downlink time slots assignable by the radio base station in the predetermined period before the reception time, and
    - calculates the predictive transmission rate from the acquired corrected transmission rate and the calculated assignment ratios, and the calculation unit calculates a multiplied result, as the predicted transmission rate, by multiplying an average value or a maximum value of the assignment ratios calculated for each predetermined period included in a setting period longer than the predetermined period.

8. A transmission rate prediction method that calculates a predictive transmission rate, which is a predictive value of a downlink transmission rate at a future time after a reception time of a downlink radio signal in a radio communication system employing HARQ scheme in which a maximum slot number that is a maximum number of downlink time slots used to transmit the downlink radio signal is changed according to reception quality of the downlink radio signal received from a radio base station, the transmission rate prediction method comprising:

a step of associating a corrected transmission rate with any one index value of the downlink transmission rate or the reception quality and storing the resultant corrected transmission rate in a storage unit, wherein the corrected transmission rate is calculated from a probability that data decoding succeeded using only some of the slots and a defined transmission rate as a downlink transmission rate when all the slots are used;

a step of predicting reception quality at the future time based on reception quality before the reception time; a step of acquiring the corrected transmission rate which is associated with the index value of the predicted reception quality from the storage unit; and a step of calculating the predictive transmission rate from the acquired corrected transmission rate, wherein the step of calculating calculates a decoding success rate, which indicates probability that the data decoding succeeds in at an nth downlink time slot of all the slots, for each index value, and calculates the corrected transmission rate from the calculated decoding success rate and the defined transmission rate for each index value, and the storage unit associates the calculated corrected transmission rate with the index value, and stores the resultant corrected transmission rate.

* * * * *